(12) United States Patent
Tearney et al.

(10) Patent No.: US 12,496,115 B2
(45) Date of Patent: Dec. 16, 2025

(54) DEVICES, SYSTEMS, AND METHODS FOR CRYOGENIC BIOPSY SAMPLING

(71) Applicant: THE GENERAL HOSPITAL CORPORATION, Boston, MA (US)

(72) Inventors: Guillermo J. Tearney, Cambridge, MA (US); David Otuya, Revere, MA (US); Yogesh Verma, Medford, MA (US); Jing Dong, Boston, MA (US); Hamid Farrokhi, Malden, MA (US)

(73) Assignee: The General Hospital Corporation, Boston, MA (US)

( * ) Notice: Subject to any disclaimer, the term of this patent is extended or adjusted under 35 U.S.C. 154(b) by 799 days.

(21) Appl. No.: 16/976,427

(22) PCT Filed: Feb. 1, 2019

(86) PCT No.: PCT/US2019/016357
§ 371 (c)(1),
(2) Date: Aug. 27, 2020

(87) PCT Pub. No.: WO2019/168634
PCT Pub. Date: Sep. 6, 2019

(65) Prior Publication Data
US 2021/0000521 A1 Jan. 7, 2021

Related U.S. Application Data

(60) Provisional application No. 62/637,517, filed on Mar. 2, 2018.

(51) Int. Cl.
*A61B 18/02* (2006.01)
*A61B 10/04* (2006.01)
(Continued)

(52) U.S. Cl.
CPC .............. *A61B 18/02* (2013.01); *A61B 10/04* (2013.01); *A61B 90/36* (2016.02);
(Continued)

(58) Field of Classification Search
CPC ....................................................... A61B 18/02
See application file for complete search history.

(56) References Cited

U.S. PATENT DOCUMENTS 5,152,748 A 10/1992 Chastagner
5,437,673 A * 8/1995 Baust ........................ A61F 7/12
606/23

(Continued)

OTHER PUBLICATIONS

European Patent Office, Partial Supplementary European Search Report, Application No. 19760241.0, Oct. 22, 2021, 13 pages.
(Continued)

*Primary Examiner* — Ronald Hupczey, Jr.
(74) *Attorney, Agent, or Firm* — QUARLES & BRADY LLP

(57) ABSTRACT

In some embodiments, devices, systems, and methods for cryogenic biopsy sampling are provided. In some embodiments, a device for cryogenic biopsy sampling is provided, the device including: a dual lumen tube; an elongated probe tip coupled to the distal end of the dual lumen tube, with a first lumen extending into a hollow portion in the tip and a second lumen in fluid communication with the hollow portion; a first port in fluid communication with the first lumen; a second port in fluid communication with the second lumen, wherein the first lumen, the elongated probe element, and the second lumen provide a closed pathway through which a substance introduced through the first port can flow through the first lumen into the elongated probe element, and out of the elongated probe element through the second lumen to the second port.

17 Claims, 26 Drawing Sheets

(51) Int. Cl.
*A61B 18/00* (2006.01)
*A61B 90/00* (2016.01)

(52) U.S. Cl.
CPC ............... *A61B 2018/00059* (2013.01); *A61B 2018/00494* (2013.01); *A61B 2018/00672* (2013.01); *A61B 2018/00821* (2013.01); *A61B 2018/00863* (2013.01); *A61B 2018/0212* (2013.01); *A61B 2018/0262* (2013.01); *A61B 2090/3614* (2016.02); *A61B 2090/3735* (2016.02)

(56) References Cited

U.S. PATENT DOCUMENTS

| | | | |
|---|---|---|---|
| 5,788,681 | A | 8/1998 | Weaver |
| 5,860,970 | A * | 1/1999 | Goddard ............... A61B 18/02 606/23 |
| 5,921,926 | A * | 7/1999 | Rolland ............. G01B 9/02091 600/478 |
| 5,967,976 | A | 10/1999 | Larsen |
| 6,527,765 | B2 | 3/2003 | Kelman |
| 8,216,153 | B2 | 7/2012 | Fischer |
| 10,327,830 | B2 * | 6/2019 | Grant .................... A61B 18/02 |
| 2003/0195436 | A1 | 10/2003 | Van Bladel et al. |
| 2004/0024392 | A1 * | 2/2004 | Lewis ................... A61B 18/02 606/22 |
| 2005/0010200 | A1 | 1/2005 | Damasco |
| 2007/0055173 | A1 * | 3/2007 | DeLonzor .......... A61B 10/0266 600/568 |
| 2008/0071332 | A1 * | 3/2008 | Nelson .................. A61B 18/20 607/96 |
| 2010/0198202 | A1 | 8/2010 | Fischer et al. |
| 2011/0071427 | A1 | 3/2011 | Fischer |
| 2011/0224576 | A1 * | 9/2011 | Jackson ............. A61B 10/0283 600/567 |
| 2012/0059364 | A1 * | 3/2012 | Baust .................... A61B 18/02 606/14 |
| 2014/0276708 | A1 * | 9/2014 | Karnik .................. A61B 18/02 606/21 |
| 2016/0206295 | A1 * | 7/2016 | Kramer ................. A61B 18/02 |

OTHER PUBLICATIONS

International Searching Authority. International Search Report and Written Opinion for application PCT/US2019/016357. Mailed on Apr. 30, 2019.

Erbe. Flexible Cryoprobe Datasheet. Accessed on Oct. 15, 2020 at https://de.erbe-med.com/de-en/products/pdf/?tx_erbeproducts_productpdf%5Bproduct%5D=39793&tx_erbeproducts_productpdf%5Baction%5D=pdf&tx_erbeproducts_productpdf%5Bcontroller%5D=Product&cHash=29849453803d322a58e85a7db2cfed1c.

European Patent Office. Extended European Search Report, Application No. 19760241.0, Mar. 4, 2022. 14 pages.

European Patent Office, Communication Pursuant to Article 94(3) EPC, Application No. 19760241.0, Aug. 2, 2023, 7 pages.

* cited by examiner

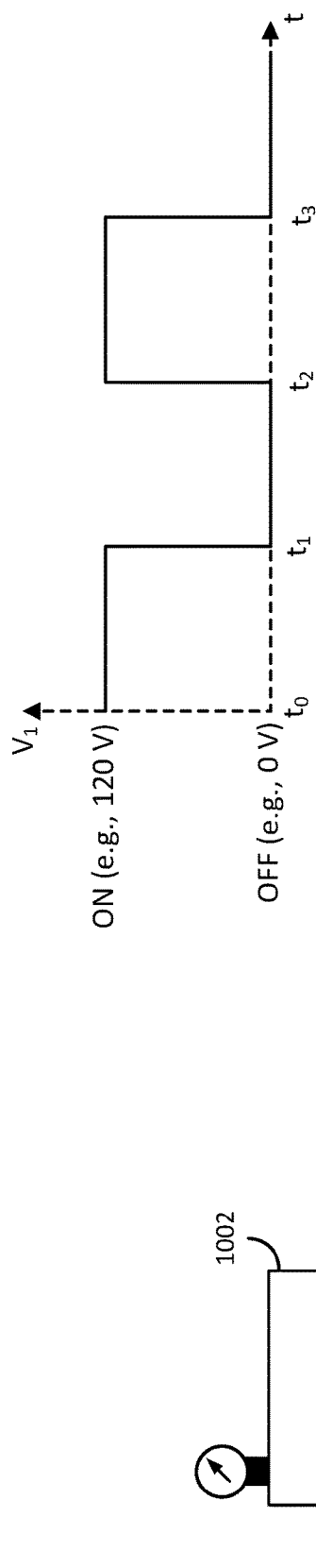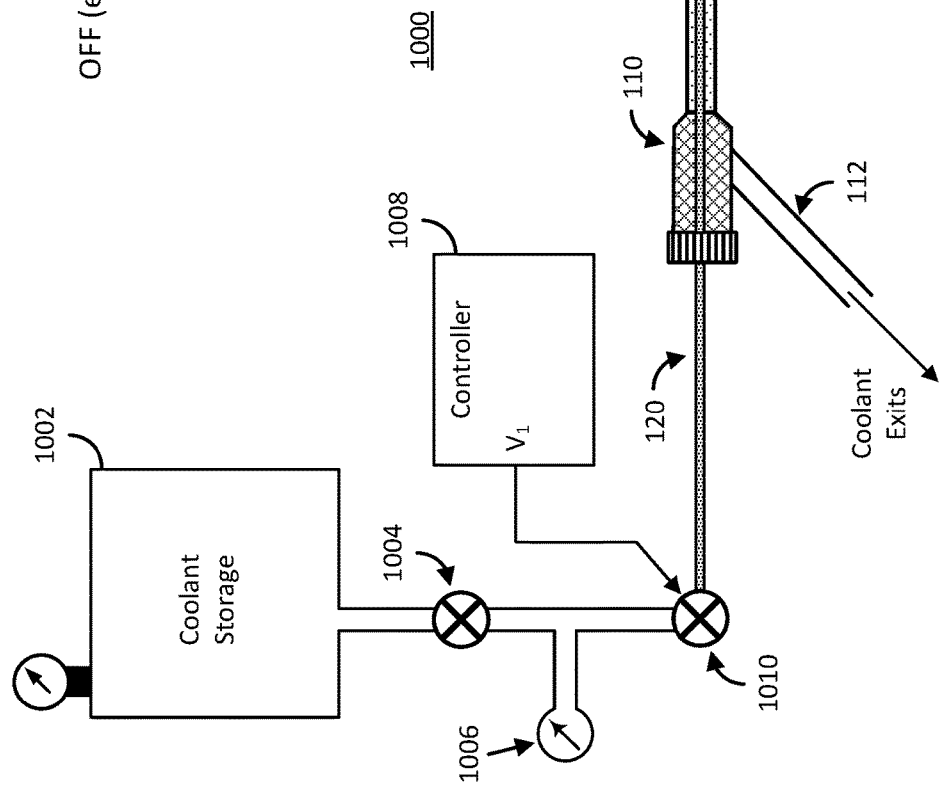

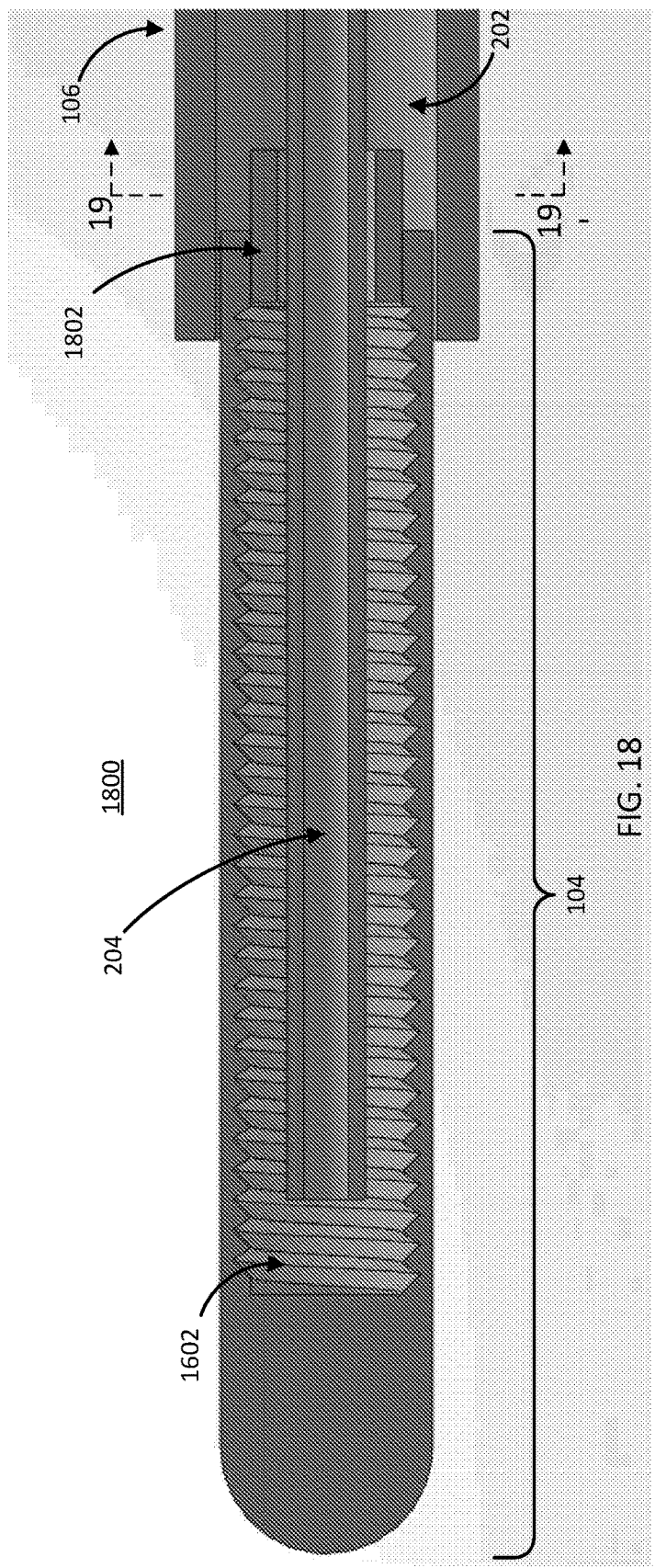
FIG. 18
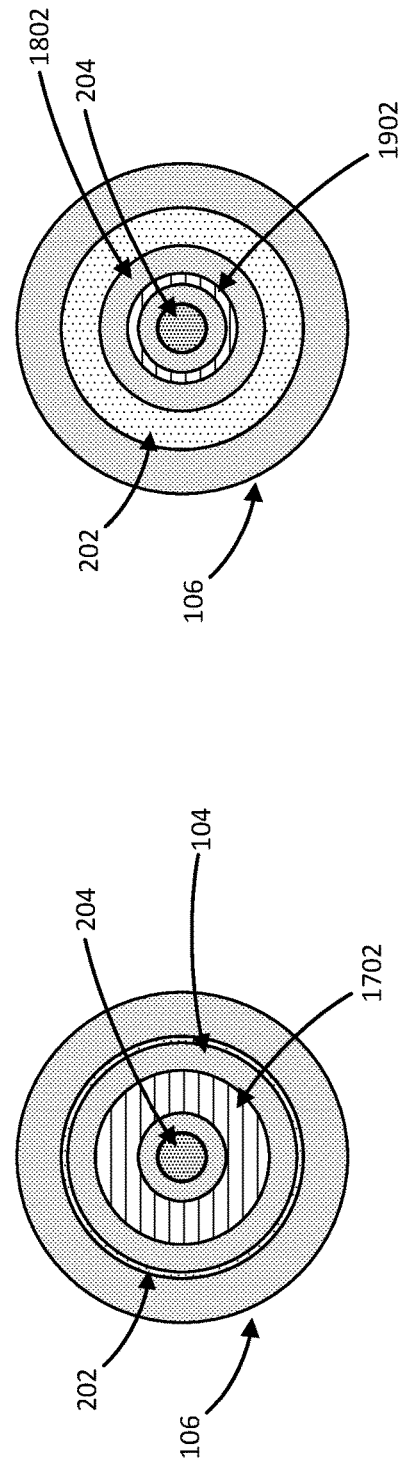
FIG. 19
FIG. 17

2302
Without Tissue Contact
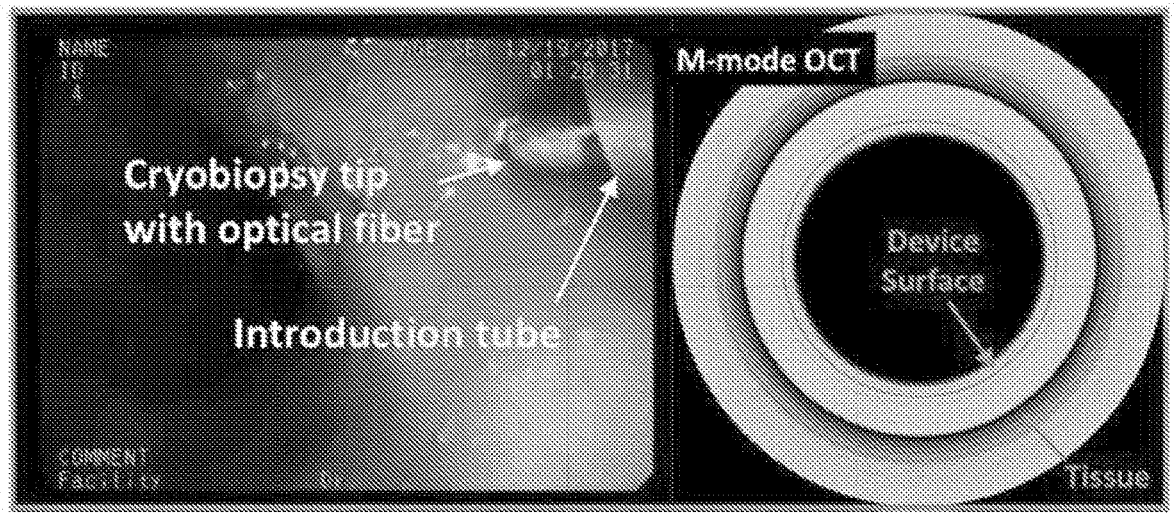
2304
With Tissue Contact
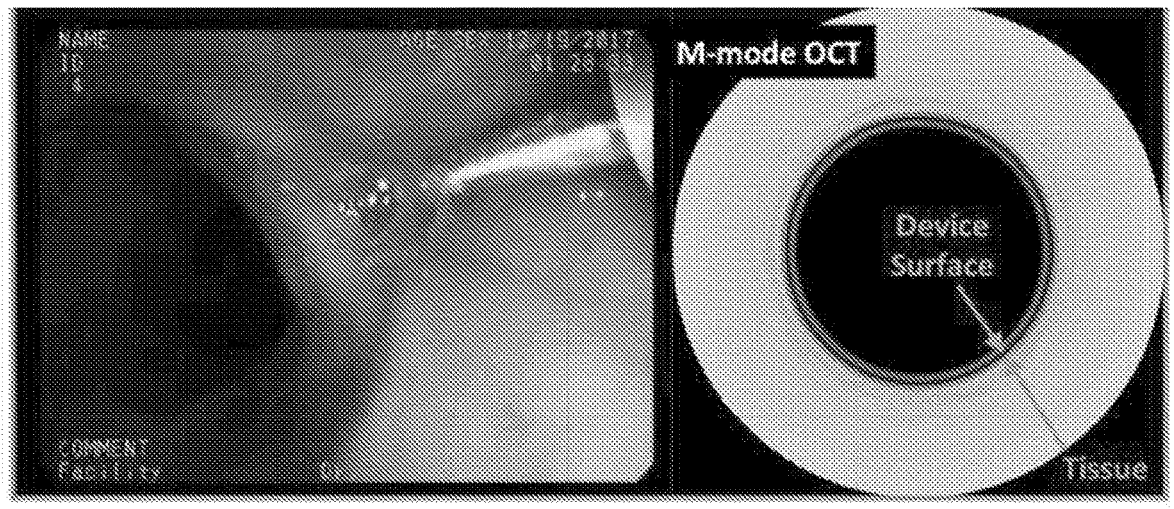
FIG. 23

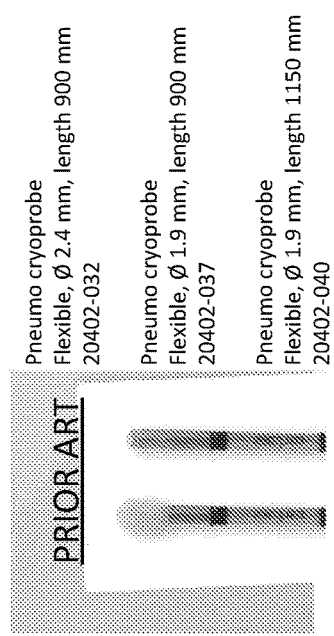

PRIOR ART

FIG. 34B

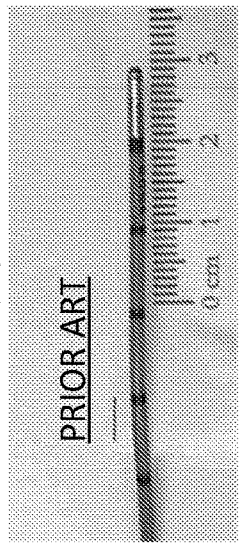

PRIOR ART

FIG. 34C

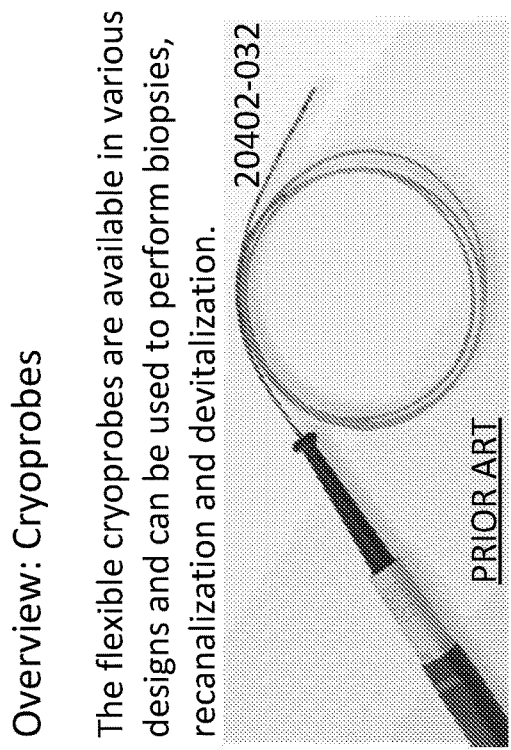

Overview: Cryoprobes

The flexible cryoprobes are available in various designs and can be used to perform biopsies, recanalization and devitalization.

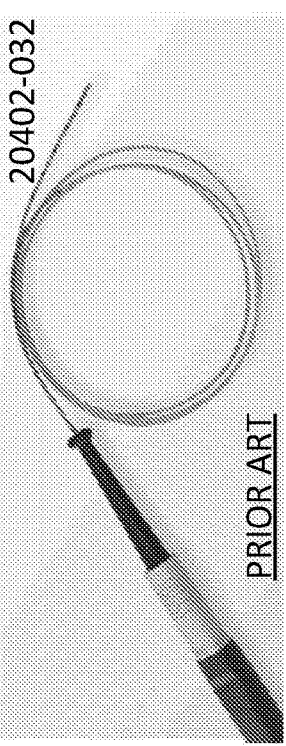

Pneumo cryoprobe Flexible, Ø 2.4 mm, length 900 mm 20402-032

Pneumo cryoprobe Flexible, Ø 1.9 mm, length 900 mm 20402-037

Pneumo cryoprobe Flexible, Ø 1.9 mm, length 1150 mm 20402-040

PRIOR ART

| Item No. | Length | Diam. | Pulmonary Application Area | | | Biopsy sample size |
|---|---|---|---|---|---|---|
| | | | Cent. Area | Periphery | | |
| 20402-032 | 900 mm | 2.4 mm | ■ | | | ● |
| 20402-037 | 900 mm | 1.9 mm | ■ | ■ | | · |
| 20402-040 | 1150 mm | 1.9 mm | ■ | ■ | | · |

FIG. 34A

| Parameter | Prior Art Cryobiopsy device | Prototype Cryobiopsy Device |
|---|---|---|
| Diameter | >1.9 mm | 1.2 (1.0 mm possible) |
| Cooling gas | $CO_2$ | Freon 410A |
| Operating Pressure | 650 - 1000 PSI | 150 - 250 PSI |

FIG. 35

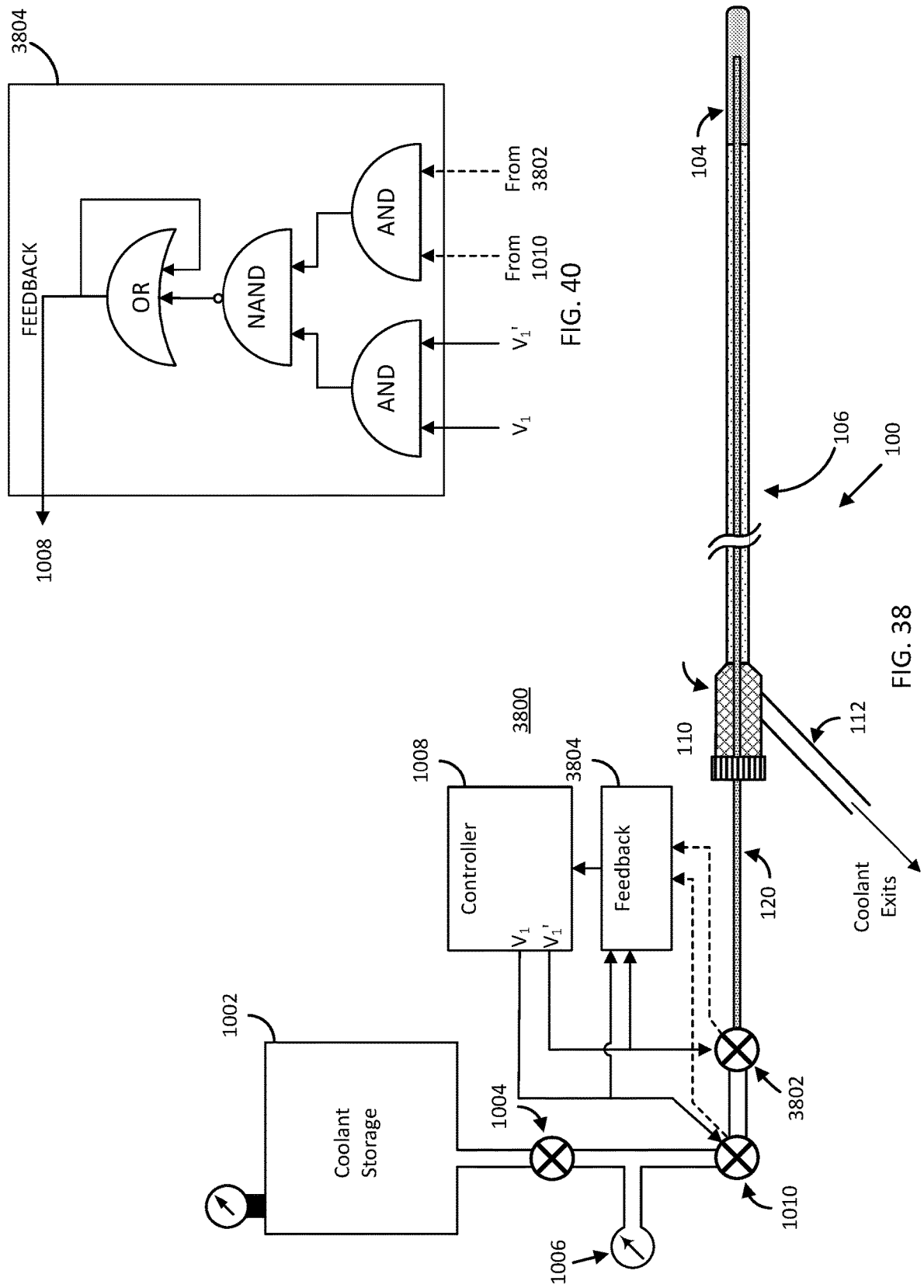

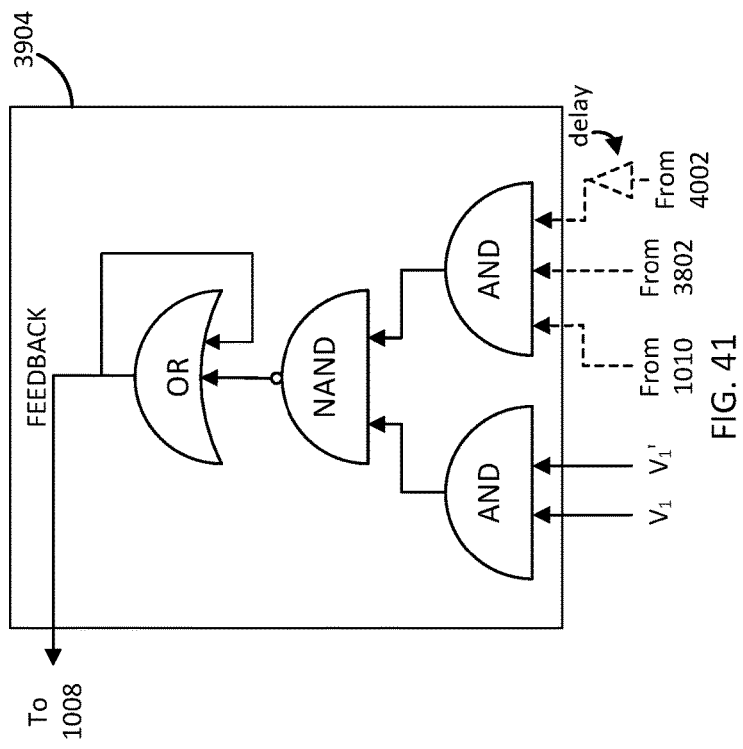
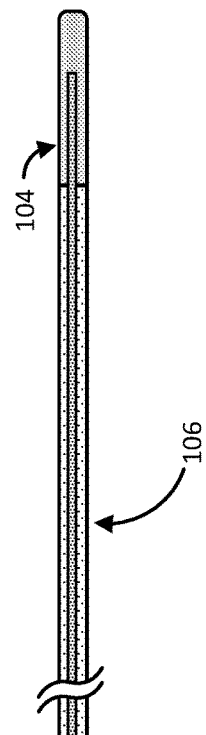
FIG. 41
FIG. 39

DEVICES, SYSTEMS, AND METHODS FOR CRYOGENIC BIOPSY SAMPLING

CROSS-REFERENCE TO RELATED APPLICATIONS

This application represents the national stage entry of PCT International Application No. PCT/US2019/016357 filed Feb. 1, 2019, which is based on, claims the benefit of, and claims priority to U.S. Provisional Application No. 62/637,517, filed Mar. 2, 2018, which is hereby incorporated herein by reference in its entirety for all purposes.

STATEMENT REGARDING FEDERALLY SPONSORED RESEARCH

N/A

BACKGROUND

Endoscopic biopsy is becoming an increasingly common procedure for biopsy tissue collection. In a conventional biopsy sampling procedure, an endoscope is guided to the site at which the biopsy tissue sample is to be collected using images generated by the endoscope. A forceps is inserted through a working channel of the endoscope and is used to cut out a tissue sample, using the images generated by the endoscope to assist the practitioner during the sampling. The size of sample that can be collected is generally limited by the size of the forceps that are used, which can be limited by the size of the working channel of the endoscope. Use of forceps can also cause bleeding in the gastrointestinal tract. Such endoscopic biopsy procedures use a relatively large endoscope (e.g., having an outer diameter of about 10 to 13 mm). This typically requires that the subject be sedated during the procedure due to the discomfort associated with insertion of the endoscope, which necessitates that the procedure be carried out in a relatively sophisticated clinical environment. These factors can make endoscopic biopsies expensive, uncomfortable, and often ill-suited to certain types of subjects (e.g., infants and children, adults that have high risks for complications when sedated, etc.).

Accordingly, new devices, systems, and methods for biopsy sampling that do not require sedation are desirable.

SUMMARY

In accordance with some embodiments of the disclosed subject matter, devices, systems, and methods for cryogenic biopsy sampling are provided.

In one embodiment, the invention provides a device for cryogenic biopsy sampling. The device includes a dual lumen tube having a proximal end and a distal end and an elongated probe element coupled to the distal end of the dual lumen tube. A first lumen of the dual lumen tube extends into a hollow portion of the elongated probe element, and a second lumen of the dual lumen tube is in fluid communication with the hollow portion. The device also includes a housing coupled to the proximal end of the dual lumen tube; a first port coupled to the housing and in fluid communication with the first lumen; and a second port coupled to the housing and in fluid communication with the second lumen. The first lumen, the elongated probe element, and the second lumen provide a closed pathway through which a substance introduced through the first port flows through the first lumen into the elongated probe element and out of the elongated probe element through the second lumen to the second port.

In another embodiment, the invention provides a system for cryogenic biopsy sampling. The system includes a cryogenic probe including: a dual lumen tube having a proximal end and a distal end; and an elongated probe element coupled to the distal end of the dual lumen tube. A first lumen of the dual lumen tube extends into a hollow portion of the elongated probe element, and a second lumen of the dual lumen tube is in fluid communication with the hollow portion. The system also includes a proximal housing whose first port is in fluid communication with the first lumen; a second port in fluid communication with the second lumen; and an electronically controllable valve coupled to the first port. The electronically controllable valve provides a connection between the first port and a coolant storage vessel. The system further includes a controller to: open the valve during a first period of time to cause coolant to flow from the coolant storage vessel through the first port and the first lumen into the elongated probe element, and close the valve during a second period of time. Coolant flows from the elongated probe element through the second lumen and out of a second port of the proximal housing during at least the second period of time.

In yet another embodiment, the invention provides a method for cryogenic biopsy sampling. The method includes steps of: inserting a cryogenic probe through a nasogastric tube and into a gastrointestinal tract of a subject; positioning a tip of the cryogenic probe at a sampling site in contact with tissue to be sampled; providing, during a first period of time, coolant at a proximal end of a first lumen of a dual lumen tube that is in fluid communication with a hollow interior of the tip such that the coolant flows through the first lumen and into the hollow interior of the tip; inhibiting, during a second period of time subsequent to the first period of time, coolant from being provided at the proximal end of the first lumen; repeating the steps of providing coolant and inhibiting coolant from being provided at least one time; withdrawing the tip of the cryogenic probe and a tissue sample from sampling site that is adhered to the tip into the nasogastric tube after repeating the steps of providing coolant and inhibiting coolant from being provided at least one time; withdrawing the cryogenic probe through the nasogastric tube until the tip and tissue sample are removed from the nasogastric tube; and continuing to repeat the steps of providing coolant and inhibiting coolant from being provided while withdrawing the cryogenic probe through the nasogastric tube.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 10 shows an example of a system for cryogenic biopsy sampling in accordance with some embodiments of the disclosed subject matter.

FIG. 11 shows an example of a control signal that can be used to control a portion of the system shown in FIG. 10 in accordance with some embodiments of the disclosed subject matter.

FIG. 17 shows an example of a cross-sectional view of the distal end shown in FIG. 16 in accordance with some embodiments of the disclosed subject matter.

FIG. 18 shows an example of another distal end of a device for cryogenic biopsy sampling in accordance with some embodiments of the disclosed subject matter.

FIG. 19 shows an example of a cross-sectional view of the distal end shown in FIG. 18 in accordance with some embodiments of the disclosed subject matter.

FIG. 23 shows examples of optical coherence tomography data that can be used to determine a distance from a tip of a device for cryogenic biopsy sampling to tissue in accordance with some embodiments of the disclosed subject matter.

FIG. 34A shows a prior art cryoprobe.

FIG. 34B shows a close up of the tip of the prior art cryoprobe.

FIG. 34C shows the length of the tip of the prior art cryoprobe.

FIG. 35 shows a table illustrating a comparison between the prior art cryoprobe and a prototype cryobiopsy device implemented in accordance with some embodiments of the disclosed subject matter.

FIG. 38 shows an example of a system for cryogenic biopsy sampling with redundant valves in accordance with some embodiments of the disclosed subject matter.

FIG. 39 shows an example of another system for cryogenic biopsy sampling with redundant valves and a suction device in accordance with some embodiments of the disclosed subject matter.

FIG. 40 shows an example of a feedback circuit that can be used in control of redundant valves of a system for cryogenic biopsy sampling in accordance with some embodiments of the disclosed subject matter.

FIG. 41 shows an example of a feedback circuit that can be used in control of redundant valves of a system for cryogenic biopsy sampling that incorporates a suction device and flow sensor in accordance with some embodiments of the disclosed subject matter.

DETAILED DESCRIPTION

In accordance with some embodiments of the disclosed subject matter, mechanisms (which can include devices, systems, and methods) for cryogenic biopsy sampling are provided.

In some embodiments, mechanisms described herein can be used to collect tissue samples by inserting a relatively small diameter probe through an introduction tube to the site at which the tissue sample is to be collected. For example, the probe can be inserted through a nasogastric tube into the gastrointestinal tract of the subject while the subject is conscious. In some embodiments, the probe can have a hollow tip that is made from a material with advantageous thermal conductivity properties (e.g., a metal with relatively high thermal conductivity such as aluminum or copper) which can be coupled to a dual lumen tube that can be used to introduce coolant through the tip, causing the tip to drop in temperature. In general, when a material at low temperatures (e.g., less than 0 degrees Celsius (° C.)) comes into contact with moist tissue, the material adheres to the tissue by transferring heat away from the tissue, which can cause the moisture in the tissue to freeze into ice. The ice in and around the tissue can also adhere to the material (e.g. a probe tip), creating a bond between the material and the tissue.

In some embodiments, the mechanisms described herein can include cooling the tip of probe to a relatively low temperature (e.g., in the range of −10° C. to −40° C.) while the tip is contact with tissue that is to be collected. As describe above, this can cause a portion of the tissue to adhere to the tip, which can then be withdrawn. When the tip is withdrawn, if a sufficient bond has been created (e.g., by removing a sufficient amount of heat from the tissue), the tissue adhered to tip can be stripped from the site of the biopsy. In some cases, gathering a sample via cryogenic sampling can reduce the risk of hemorrhage at the site (e.g., by freezing the tissue around the sample that is removed). Additionally, a probe with a relatively small diameter can be used to collect the sample, as the sample can be collected without requiring continuous/live imaging that is necessary to safely collect a sample using forceps. In some embodiments, the mechanisms described herein can be fabricated relatively inexpensively, as the materials that can be used to create the mechanisms are readily available and the construction of the probe is relatively simple. In some embodiments, a diameter of the probe can be selected based on a site from which a tissue sample is to be extracted and/or based on an amount of tissue to be sampled. For example, as probe diameter increases the probe can extract a larger sample (in diameter and/or depth), while as probe diameter decreases the probe can extract a smaller sample.

Figure 1:
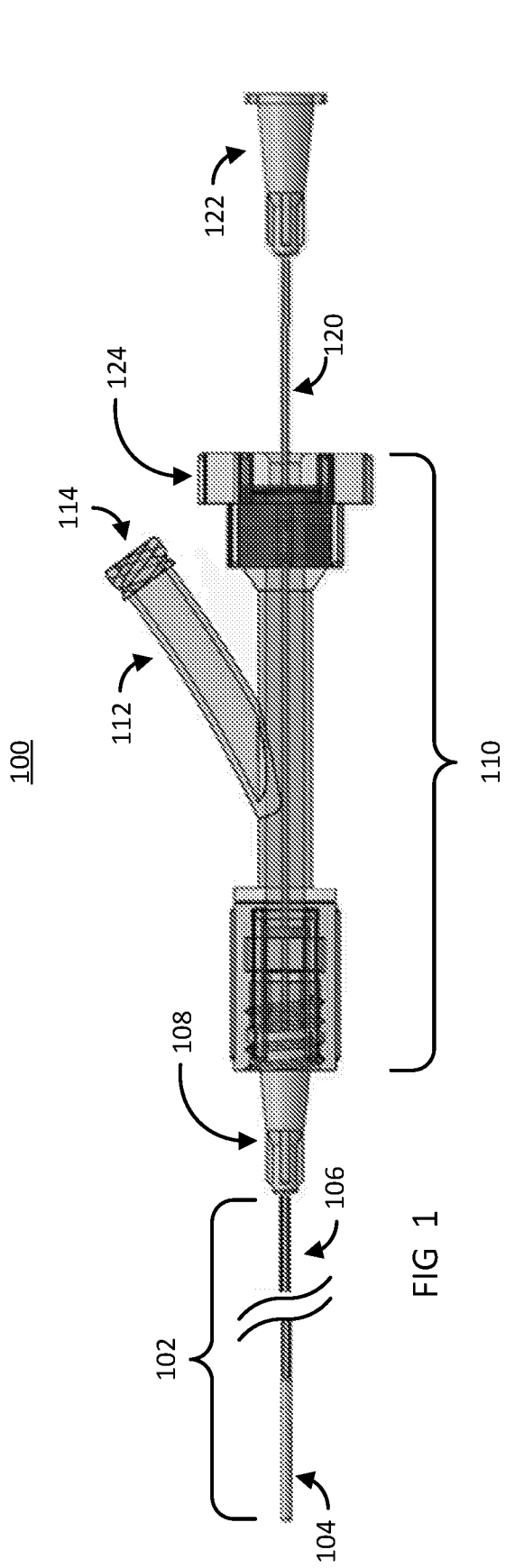
FIG. 1 shows an example of a device for cryogenic biopsy sampling in accordance with some embodiments of the disclosed subject matter.

FIG. 1 shows an example 100 of a device for cryogenic biopsy sampling in accordance with some embodiments of the disclosed subject matter. As shown in FIG. 1, device 100 can include a cryogenic probe 102 that can be inserted into a subject's body to collect a biopsy sample. For example, in some embodiments, cryogenic probe 102 can be inserted into the subject's gastrointestinal tract to collect a sample of tissue from a portion of the subject's gastrointestinal tract, such as the subject's duodenum. As described below, in some embodiments, cryogenic probe 102 can have a relatively small diameter, such that it can be inserted without sedation, for example by inserting cryogenic probe 102 through a nasogastric tube and/or through an enteral feeding tube. Additionally or alternatively, cryogenic probe 102 can be used to collect a sample from subjects that are not good candidates for endoscopy, such as newborn infants.

In some embodiments, cryogenic probe 102 can include a tip 104 and a dual lumen tube 106. In some embodiments, tip 104 can be implemented using a thermally conducting material that can provide a pathway for coolant between a first lumen of dual lumen tube 106 and a second lumen of dual lumen tube 106. For example, tip 104 can be a metal or metal alloy (e.g., aluminum, copper, silver, gold, stainless steel, etc.). In some embodiments, as described below in connection with FIG. 3, when coolant enters tip 104 it can cool tip 104 through one or more mechanisms, such as evaporative cooling, the Joule-Thomson effect, and convection. For example, in the case of evaporative cooling, the coolant travels through the probe 102 as a liquid and then expands to a gas at the tip 104, absorbing heat in the process and acting to cool the tip 104. As another example, in the case of the Joule-Thomson effect, when the coolant flows from a higher pressure to a lower pressure environment (e.g., from a relatively small conduit into the interior of tip 104) the coolant expands into the larger volume, causing the temperature of the coolant to drop.

In some embodiments, tip 104 can form a distal end of cryogenic probe 102 (i.e., the end of cryogenic probe 102 that is inserted), and a proximal end of cryogenic probe 102 can be coupled to and/or include a connector 108 that is configured to couple cryogenic probe 102 to a housing 110 using any suitable technique or combination of techniques. For example, connector 108 can be a Luer-type connector, such as a female Luer fitting that is configured to form a locking Luer connection with a male Luer fitting.

In some embodiments, housing 110 can include a fitting (e.g., a male Luer fitting) for receiving connector 108 at a distal end of housing 110. In some embodiments, housing 110 can form bore holes through which tubes, gases, liquids, etc., can pass. As shown in FIG. 1, housing 110 can form a first bore hole passing from the distal end of housing 110 to a proximal end of housing 110. Additionally, in some embodiments, housing 110 may include a Y-adapter (e.g., a hemostatic Y-adapter) which can include an arm 112 that forms a second bore hole that intersects the first bore hole (or a double Y adapter that has multiple side arms, e.g., as described below in connection with FIG. 5). In some embodiments, arm 112 can include a port 114 that can be configured to be coupled to, for example, tubing to form a conduit for gas and/or fluid. As shown in FIG. 1, the first borehole can be co-located with a long axis of housing 110, and the second borehole can be formed by an off-axis arm; however this is merely an example and housing 110 and the various boreholes running through housing 110 can be implemented in various configurations.

In some embodiments, a tube 120 can pass through housing 110, and can be in liquid communication with one of the passageways of dual lumen tube 106. For example, in some embodiments, a distal end of tube 120 can be connected to an inner lumen of dual lumen tube 106, e.g. at connector 108. In some embodiments, a proximal end of tube 120 can be coupled to and/or include a connector 122 that is configured to couple tube 120 to a coolant source using any suitable technique or combination of techniques. For example, connector 122 can be a Luer-type connector, such as a female Luer fitting that is configured to form a locking Luer connection with a male Luer fitting. In some embodiments, tube 120 may enter housing 110 through a fluid-tight connector 124, which prevents coolant (liquid or gas) from exiting through the back end of housing 110 and instead directs coolant to exit through port 114.

In some embodiments, cryogenic probe 102 can be implemented with any suitable dimensions. For example, cryogenic probe 102 can be implemented to have an external diameter that smaller than an insertion tube to be used to introduce cryogenic probe 102 to a site at which tissue is to be sampled. In such an example, if insertion is to be through a nasogastric tube, cryogenic probe 102 can be implemented to have an external diameter that is smaller than an internal diameter of the nasogastric tube. In one particular example, tip 104 and can have an external diameter of about 1.5 millimeters (mm) (i.e., between 4 and 5 French), and dual lumen tube 106 can have an external diameter of about 1.1 mm (i.e., between 3 and 4 French). As many nasogastric tubes have diameters of at least 8 French (about 2.7 mm), cryogenic probe 102 may be introduced by insertion through a nasogastric tube. In some embodiments, cryogenic probe 102 can have any length that is suitable to reach a site from which a tissue sample is to be taken. For example, in some embodiments, cryogenic probe 102 can have a length of about 1.5 meters (m) to facilitate biopsy sampling of tissue at various distances from an insertion point (e.g. oral or nasal).

Figure 2:
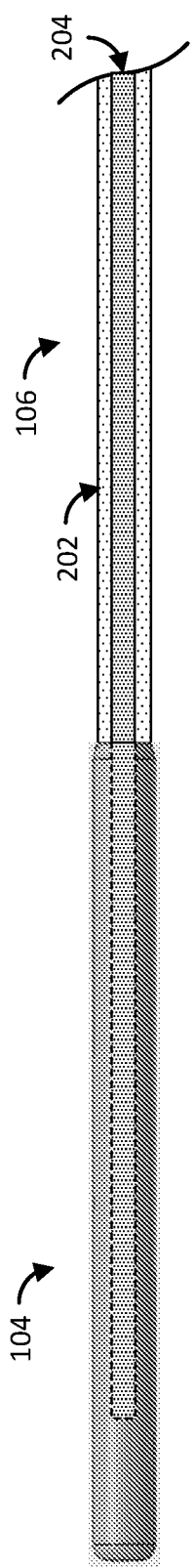
FIG. 2 shows an example of dual lumen catheter and thermal conducting tip that can be used in connection with the device shown in FIG. 1 in accordance with some embodiments of the disclosed subject matter.

FIG. 2 shows an example of dual lumen catheter and thermal conducting tip that can be used in connection with the device shown in FIG. 1 in accordance with some embodiments of the disclosed subject matter. As shown in FIG. 2, dual lumen tube 106 can include an outer tube 202 and an inner tube 204. In some embodiments, outer tube 202 and inner tube 204 can be implemented with any suitable dimensions. For example, outer tube 202 can have a diameter that is on the order of 1 mm, and inner tube 204 can have a diameter that is on the order of 0.5 mm. In one particular example, outer tube 202 can have a diameter of about 1.1 mm, and inner tube 204 can have a diameter of 635 micrometers (μm)/0.635 mm. In general, the diameter of inner tube 204 affects the amount of cooling (e.g., an inner tube 204 having a smaller diameter would generally be at higher pressure, causing a greater cooling effect when the coolant expands into tip 104). Accordingly, implementing inner tube 204 with a smaller diameter can increase the cooling effect, but may reduce the amount of coolant that can be provided into the tip all else being equal (e.g., at equal pressures). In some embodiments tip 104 has a larger outer diameter than outer tube 202 of dual lumen tube 106 (e.g. FIG. 2), in other embodiments tip 104 has an approximately same diameter as dual lumen tube 106 (e.g. FIG. 7), and in yet other embodiments tip 104 has a smaller diameter than dual lumen tube 106 (e.g. FIGS. 16, 18).

Figure 3:
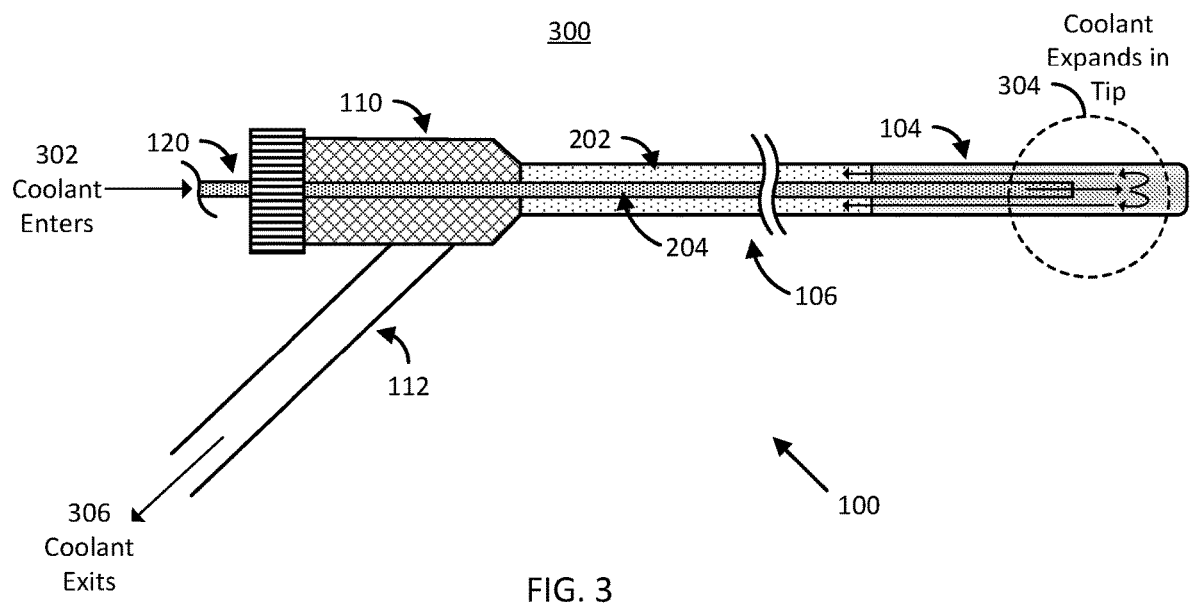
FIG. 3 shows an example of coolant flow through a device for cryogenic biopsy sampling in accordance with some embodiments of the disclosed subject matter.

FIG. 3 shows an example 300 of coolant flow through a device for cryogenic biopsy sampling in accordance with some embodiments of the disclosed subject matter. As shown in FIG. 3, coolant can enter device 100 through tube 120 at step 302, and can pass through inner tube 204 of dual lumen tube 106 to tip 104 where the coolant can exit inner tube 204. At step 304, the coolant can expand within tip 104 and begin flowing back toward outer tube 202. In some embodiments, as the coolant flows through tip 104 toward outer tube 202, the expanded or expanding coolant absorbs energy during its phase transition from liquid to gas and can transfer heat from tip 104 to the coolant, reducing the temperature of tip 104. At 306, the coolant can exit device 100 through the bore through arm 112 of the proximal housing 110. In some embodiments, any suitable coolant can be used, such as Freon® 134a or Freon® 410a.

Figure 4:
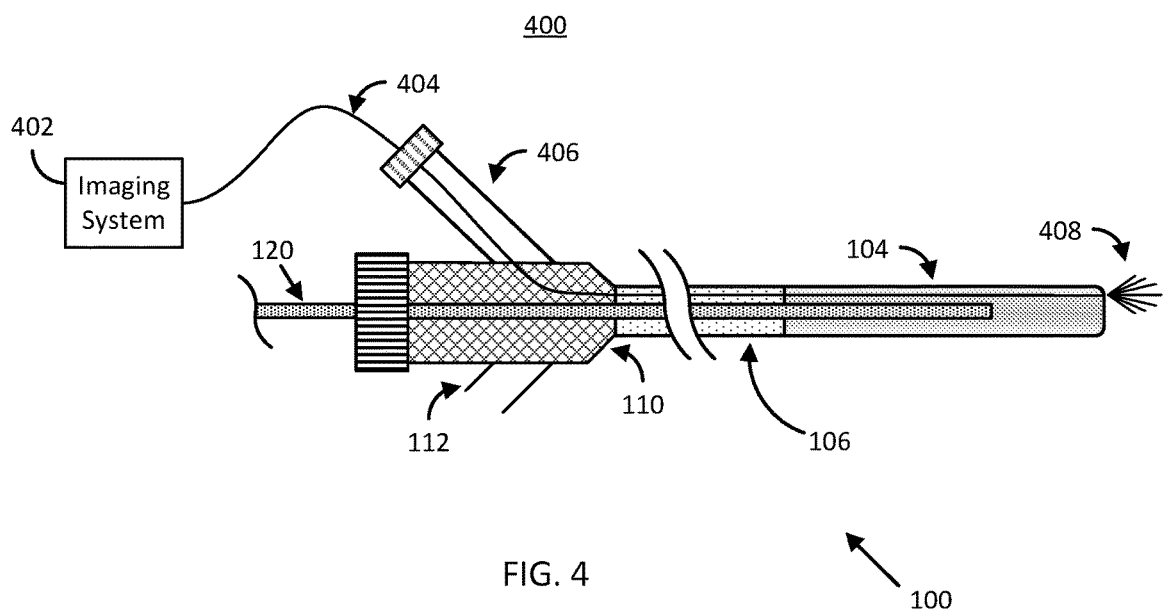
FIG. 4 shows an example of a device for cryogenic biopsy sampling with a waveguide running through the device to the tip of the device for cryogenic biopsy sampling in accordance with some embodiments of the disclosed subject matter.

FIG. 4 shows an example 400 of a device for cryogenic biopsy sampling with a waveguide running through the device to the tip of the device for cryogenic biopsy sampling in accordance with some embodiments of the disclosed subject matter. As shown in FIG. 4, an imaging system 402 can be coupled to an optical waveguide 404 (e.g., an optical fiber, a fiber optic cable, etc.), which can pass through an arm 406 of housing 110, through dual lumen tube 106, and through tip 104. In some embodiments, imaging system 402 can include a light source that can emit light that is guided from a proximal end of optical waveguide 404 to a distal end at which it is emitted 408 from tip 104. As described below in connection with FIGS. 20 and 23, in some embodiments, imaging system 402 can be an optical coherence tomography (OCT) device that can, among other things, be used to determine a distance from the distal end of tip 104 to tissue to be sampled. For example, emitted light 408 can be reflected by tissue, and a distance from tip 104 to the tissue can be determined based on a frequency or frequencies at which interference is detected between reflected light returning to imaging system 402 along optical waveguide 404 and light from a reference beam having a path length that is equivalent to the expected path length from imaging system 402 to the tissue to be sampled.

Figure 5:
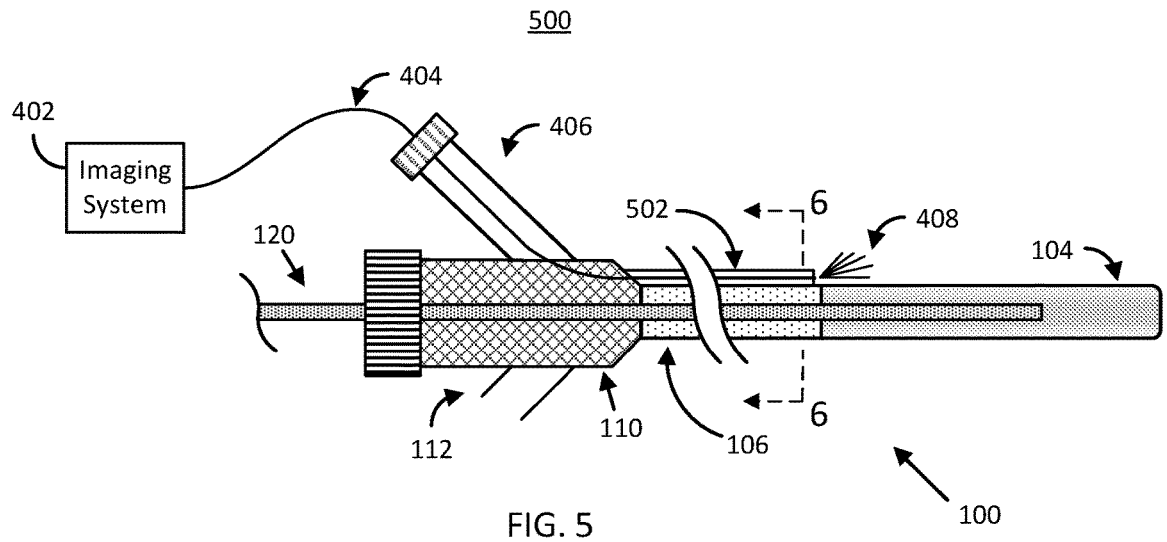
FIG. 5 shows an example of a device for cryogenic biopsy sampling with a waveguide that passes through a housing of the device and through a third lumen coupled to the coolant tube of the device in accordance with some embodiments of the disclosed subject matter.

FIG. 5 shows an example 500 of a device for cryogenic biopsy sampling with a waveguide that passes through a housing of the device and through a third lumen coupled to the coolant tube of the device in accordance with some embodiments of the disclosed subject matter. As shown in FIG. 5, imaging system 402 can be coupled to optical waveguide 404, which can pass through arm 406 of housing 110, through a third lumen 502 that runs along the outside of dual lumen tube 106, and ends near tip 104. In some embodiments, imaging system 402 can include one or more light sources that can emit light that is guided from a proximal end of optical waveguide 404 to a distal end at which it is emitted 408 toward the distal end of tip 104 (e.g., from a polished end of waveguide 404). As described below in connection with FIGS. 9 and 20, in some embodiments, imaging system 402 can detect the relative absorption of light at multiple wavelengths to detect the presence (or absence) of blood and/or the rate at which the amount of blood present is changing (e.g., based on the change in the relative absorption over time). For example, as described below in connection with FIG. 9, light 408 can include light at two wavelengths, e.g. 550 nm and 650 nm. The difference in absorption at the two wavelengths can be used as an indication of the presence of blood, as blood absorbs a much higher proportion of light at 550 nm than at 650 nm (e.g., on the order of one to two orders of magnitude). Accordingly, an increase in the amount of light detected at 650 nm relative to the amount of light detected at 550 nm can indicate the presence of blood near tip 104, which may indicate that the biopsy is causing bleeding.

Figure 6:
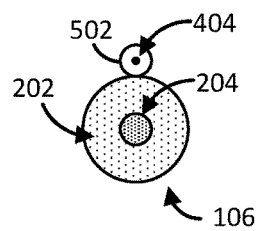
FIG. 6 shows of a cross-sectional view of a portion of the device shown in FIG. 5 in accordance with some embodiments of the disclosed subject matter.

FIG. 6 shows a cross-sectional view of a portion of the device shown in FIG. 5 in accordance with some embodiments of the disclosed subject matter. As shown in FIG. 6, third lumen 502 can be disposed outside of, and adjacent to, dual lumen tube 106. Note that FIG. 6 is intended to show the relative positions of lumen 502 and dual lumen 106, and does not necessarily reflect the relative sizes.

Figure 7:
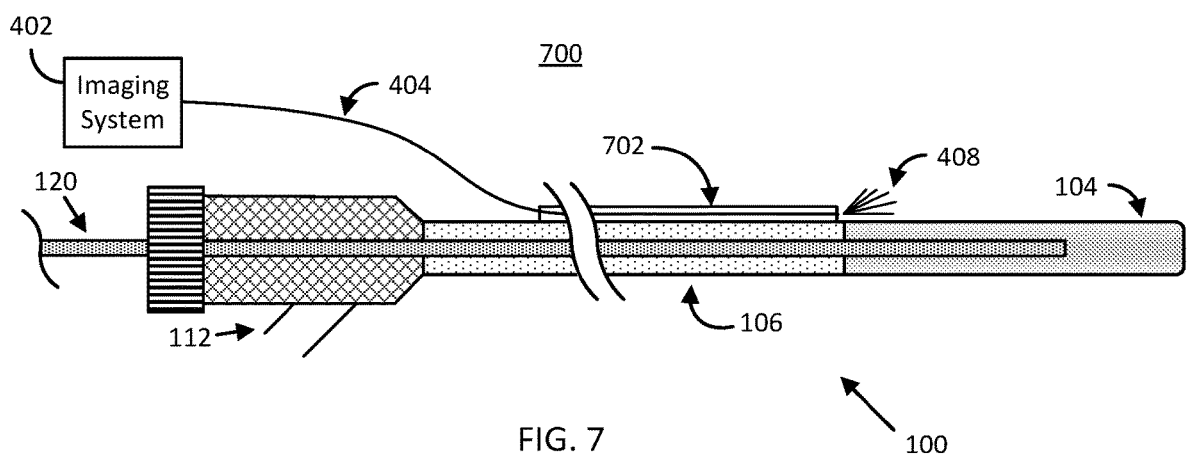
FIG. 7 shows an example of a device for cryogenic biopsy sampling with a waveguide that passes through a third lumen coupled to the coolant tube of the device in accordance with some embodiments of the disclosed subject matter.

FIG. 7 shows an example 700 of a device for cryogenic biopsy sampling with a waveguide that passes through a third lumen coupled to the coolant tube of the device in accordance with some embodiments of the disclosed subject matter. As shown in FIG. 7, device 700 can be configured similarly to device 500 of FIG. 5, except that optical waveguide 404 does not pass through housing 110, but passes directly into a third lumen 702 that is positioned similarly to third lumen 502. Note that although optical waveguide 404 is shown as being one continuous element in FIGS. 4, 5, and 7, this is merely to illustrate the path of optical waveguide 404 and is not intended to limit the disclosed subject matter to such an implementation. For example, optical waveguide 404 can include multiple optical waveguides that are interfaced at connectors (e.g., optical waveguide 404 can terminate at a connector integrated into arm 406, and can be coupled to imaging system 402 by a second optical waveguide that is interfaced using a fiber optic connector). In some embodiments, multiple optical waveguides can be used, for example to detect distance to tissue and bleeding, which may be facilitated by the use of multiple imaging systems.

Figure 8:
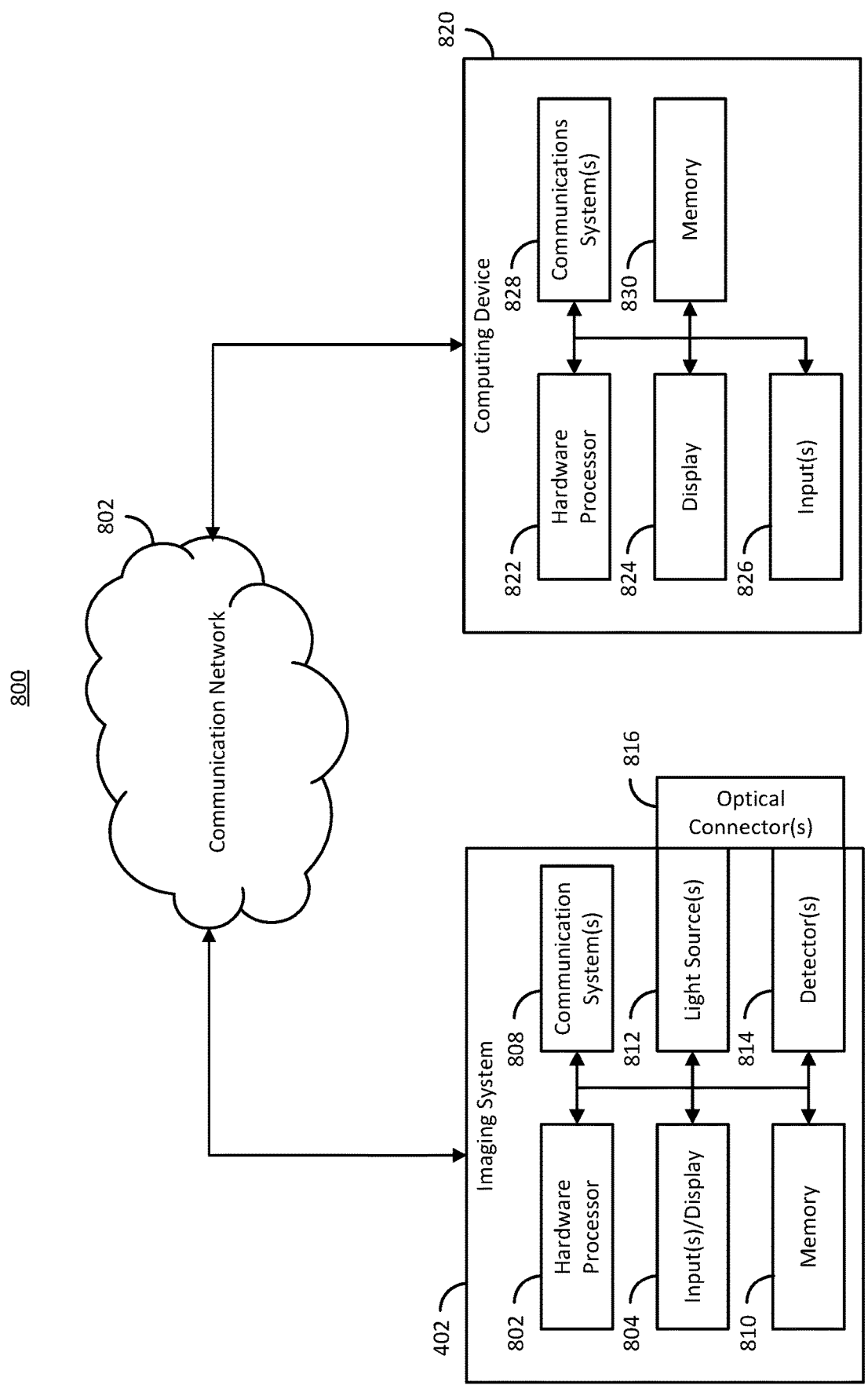
FIG. 8 shows an example of hardware that can be used to implement an imaging device and/or a computing device that can be used in connection with some embodiments of devices for cryogenic biopsy sampling in accordance with some embodiments of the disclosed subject matter.

FIG. 8 shows an example 800 of hardware that can be used to implement an imaging device and/or a computing device that can be used in connection with some embodiments of devices for cryogenic biopsy sampling in accordance with some embodiments of the disclosed subject matter. As shown in FIG. 4, in some embodiments, imaging system 402 can include a hardware processor 802, a user interface and/or display 804, one or more communication systems 808, memory 810, one or more light sources 812, one or more light detectors 814, and/or one or more optical connectors 816. In some embodiments, hardware processor 802 can be any suitable hardware processor or combination of processors, such as a central processing unit (CPU), a graphics processing unit (GPU), a microcontroller (MCU), a field programmable gate array (FPGA), an application-specific integrated circuit (ASIC), a dedicated image processor, etc. In some embodiments, input(s) and/or display 804 can include any suitable display device(s), such as a computer monitor, a touchscreen, a television, a transparent or semitransparent display, a head mounted display, etc., and/or input devices and/or sensors that can be used to receive user input, such as a keyboard, a mouse, a touchscreen, a microphone, a gaze tracking system, motion sensors, etc.

In some embodiments, communications systems 808 can include any suitable hardware, firmware, and/or software for communicating information over a communication network 802 and/or any other suitable communication networks. For example, communications systems 808 can include one or more transceivers, one or more communication chips and/or chip sets, etc. In a more particular example, communications systems 808 can include hardware, firmware and/or software that can be used to establish a Wi-Fi connection, a Bluetooth connection, a cellular connection, an Ethernet connection, an optical connection, etc.

In some embodiments, communication network 802 can be any suitable communication network or combination of communication networks. For example, communication network 802 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, etc. In some embodiments, communication network 802 can be a local area network, a wide area network, a public network (e.g., the Internet), a private or semi-private network (e.g., a corporate or university intranet), any other suitable type of network, or any suitable combination of networks. Communications links shown in FIG. 8 can each be any suitable communications link or combination of communications links, such as wired links, fiber optic links, Wi-Fi links, Bluetooth links, cellular links, etc.

In some embodiments, memory 810 can include any suitable storage device or devices that can be used to store instructions, values, etc., that can be used, for example, by hardware processor 802 to process image data generated by one or more optical detectors, to present content using input(s)/display 804, to communicate with a computing device 820 via communications system(s) 808, etc. Memory 810 can include any suitable volatile memory, non-volatile memory, storage, any other suitable type of storage medium, or any suitable combination thereof. For example, memory 810 can include RAM, ROM, EEPROM, one or more flash drives, one or more hard disks, one or more solid state drives, one or more optical drives, etc. In some embodiments, memory 810 can have encoded thereon a computer program for controlling operation of imaging system 402. In some such embodiments, hardware processor 802 can execute at least a portion of the computer program to control one or more light sources and/or detectors, to generate images and/or calculate values (e.g., an OCT image, a value indicative of the presence of blood, etc.), transmit and/or receive information to/from computing device 820, etc.

In some embodiments, imaging system 402 can include one or more light sources 812, such as narrow band light sources (e.g., a 550 nm laser or light emitting diode, a 650 nm laser or light emitting diode, etc.) or coherent or incoherent broad band light sources (e.g., a broad band laser configured to sweep various wavelengths, a broadband light emitting diode or combination of light emitting diodes, a white light source, etc.). Additionally, in some embodiments, light sources 812 can be associated with one or more filters.

In some embodiments, imaging system 402 can include one or more light detectors 814, such as one or more photodiodes, and/or one or more image sensors (e.g., a CCD image sensor, a CMOS image sensor). For example, in some embodiments, detectors 814 can include one or more detectors configured to detect light at specific wavelengths (e.g., using filters, using timing signals, using optics to guide light of different wavelengths to different portions of the detector(s), etc.)

In some embodiments, imaging system 402 can include one or more optical connectors 816. For example, such optical connectors can be fiber optic connectors configured to form an optical connection between light source(s) 812 and/or detector 814 and an optical fiber (e.g., as part of a fiber optic cable).

In some embodiments, computing device 820 can include a hardware processor 822, a display 824, one or more inputs 826, one or more communication systems 828, and/or memory 830. In some embodiments, hardware processor 822 can be any suitable hardware processor or combination of processors, such as a CPU, a GPU, an MCU, an FPGA, ASIC, a dedicated image processor, etc. In some embodiments, display 824 can include any suitable display devices, such as a computer monitor, a touchscreen, a television, a transparent or semitransparent display, a head mounted display, etc. In some embodiments, inputs 826 can include any suitable input devices and/or sensors that can be used to receive user input, such as a keyboard, a mouse, a touchscreen, a microphone, a gaze tracking system, motion sensors, etc.

In some embodiments, communications systems 828 can include any suitable hardware, firmware, and/or software for communicating information over communication network 802 and/or any other suitable communication networks. For example, communications systems 828 can include one or more transceivers, one or more communication chips and/or chip sets, etc. In a more particular example, communications systems 828 can include hardware, firmware and/or software that can be used to establish a Wi-Fi connection, a Bluetooth connection, a cellular connection, an Ethernet connection, etc.

In some embodiments, memory 830 can include any suitable storage device or devices that can be used to store instructions, values, etc., that can be used, for example, by hardware processor 822 to present content using display 824, to communication with one or more imaging devices, etc. Memory 830 can include any suitable volatile memory, non-volatile memory, storage, any other suitable type of storage medium, or any suitable combination thereof. For example, memory 830 can include RAM, ROM, EEPROM, one or more flash drives, one or more hard disks, one or more solid state drives, one or more optical drives, etc. In some embodiments, memory 830 can have encoded thereon a computer program for controlling operation of computing device 820. In such embodiments, hardware processor 822 can execute at least a portion of the computer program to receive content (e.g., image content) from one or more imaging devices (e.g., imaging device 402), present content (e.g., images and/or values,) transmit content to one or more other computing devices and/or imaging systems, etc.

In some embodiments, computing device 820 can be any suitable computing device, such as a general purpose computer or special purpose computer. For example, in some embodiments, computing device 820 can be a smartphone, a wearable computer, a tablet computer, a laptop computer, a personal computer, a server, etc. As another example, in some embodiments, computing device 820 can be a medical device, a system controller (e.g., a system on a chip configured to control a system for performing cryogenic biopsy sampling), etc.

Figure 9:
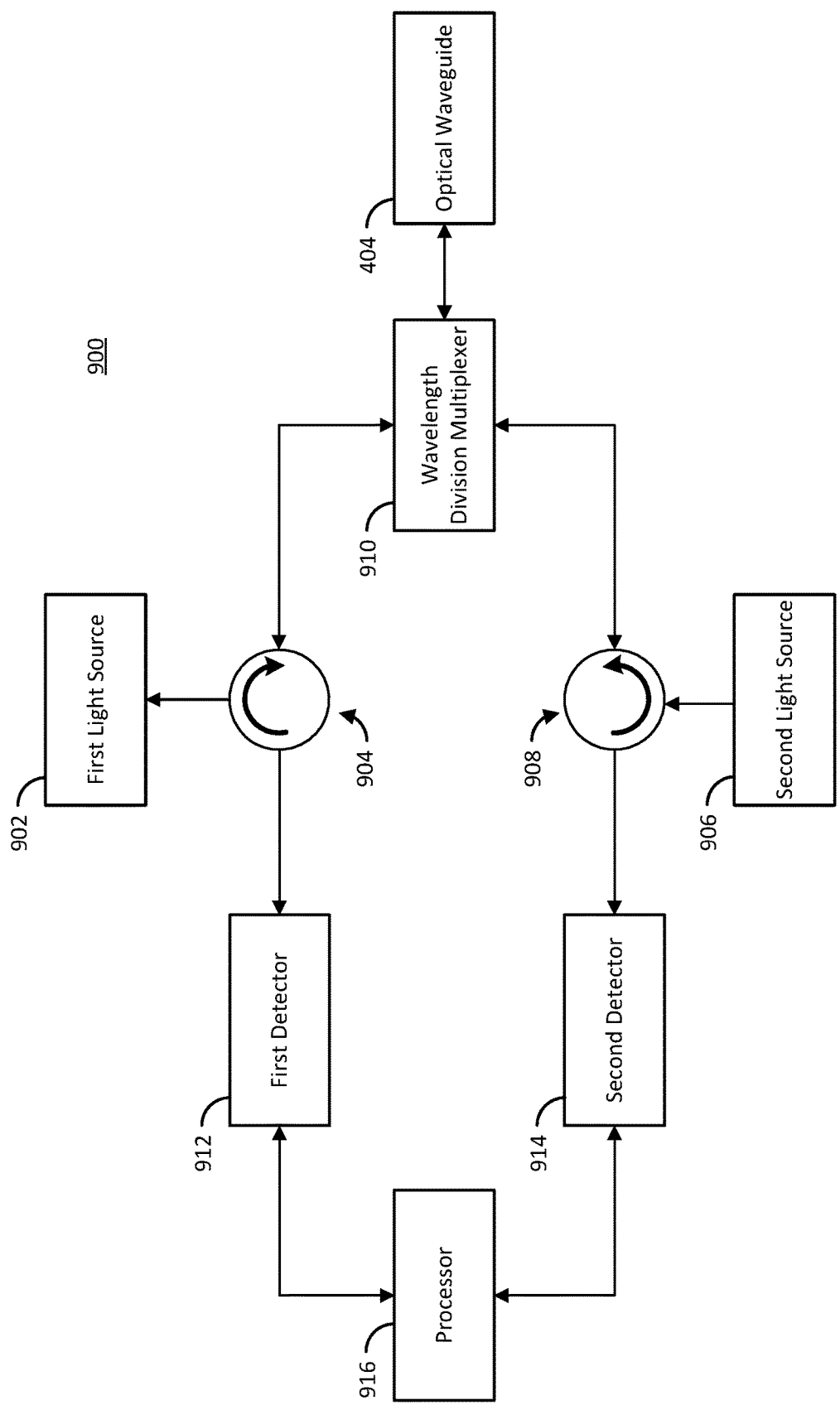
FIG. 9 shows an example of a portion of an imaging system that can be used to monitor blood loss at the site of a cryogenic biopsy being carried out a device for cryogenic biopsy sampling implemented in accordance with some embodiments of the disclosed subject matter.

FIG. 9 shows an example 900 of a portion of an imaging system that can be used to monitor blood loss at the site of a cryogenic biopsy being carried out using a device for cryogenic biopsy sampling implemented in accordance with some embodiments of the disclosed subject matter. As shown in FIG. 9, imaging system 900 can include a first light source 902 that produces light at a first wavelength (e.g., 550 nm) that emits light toward a first optical circulator 904, and a second light source 906 that produces light at a second wavelength (e.g., 650 nm) that emits light toward a second optical circulator 908.

In some embodiments, first optical circulator 904 can emit light from first light source 902 toward a wavelength division multiplexer 910, and second optical circulator 908 can emit light from second light source 906 toward wavelength division multiplexer 910, which can emit light from both first light source 902 and second light source 906 toward an optical waveguide (e.g., optical waveguide 404). For example, as described above in connection with FIGS. 5 and 7, optical waveguide 404 can be configured to emit light toward a tip (e.g., tip 104) of a cryogenic biopsy sampling device, and can receive light reflected from any material in the field of view of optical waveguide 404.

In some embodiments, wavelength division multiplexer 910 can receive light from optical waveguide 404 (e.g., light reflected by material near the tip of the cryogenic probe), and can emit light of the first wavelength (e.g., 550 nm) toward first optical circulator 904, which can emit the light received from wavelength division multiplexer 910 toward a first detector 912. Additionally, in some embodiments, wavelength division multiplexer 910 can emit light of the second wavelength (e.g., 650 nm) received from optical waveguide 404 toward second optical circulator 908, which can emit the light received from wavelength division multiplexer 910 toward a second detector 914.

In some embodiments, first detector 912 can generate first signals based on the amount of light received of the first wavelength (e.g., 550 nm) and transmit the signals to a processor 916. In some such embodiments, second detector 914 can generate second signals based on the amount of light received of the second wavelength (e.g., 650 nm) and transmit the signals to processor 916. In some embodiments, first detector 912 and second detector 914 can be separate detectors that are configured to detect light of a particular wavelength(s) (e.g., by placing a narrowband filter in front of one or more photodiodes). Alternatively, in some embodiments, first detector 912 and second detector 914 can be different portions of the same detector (e.g., different portions of a CCD or CMOS sensor), and processor 916 can determine the relative amounts of the two wavelengths detected based on the location at which the light was received. In some embodiments, processor 916 can be any suitable processor, such as hardware processor 802 or hardware processor 822.

In some embodiments, processor 900 can determine whether and/or how much blood is present at the distal end of optical waveguide 404 based on the amount of light received at first detector 912 and second detector 914. In some such embodiments, processor 900 can alert a user (e.g., a healthcare provider) to the presence of blood based on a value calculated using the first signals and second signals. Note that the specific components shown in imaging system 900 are merely examples, and other implementations of an imaging system for detecting the relative absorption of two wavelengths are possible.

FIG. 10 shows an example of a system 1000 for cryogenic biopsy sampling in accordance with some embodiments of the disclosed subject matter. As shown in FIG. 10, system 1000 can include a device for cryogenic biopsy sampling (e.g., device 100 is shown in FIG. 10, but other devices, such as devices 400, 500, or 700 can be used), and a coolant storage vessel 1002. In some embodiments, coolant storage vessel 1002 can be any suitable coolant storage vessel such as a gas or liquid cylinder or bottle.

In some embodiments, cryogenic biopsy sampling device 100 can be coupled to coolant storage 1002 via one or more valves. For example, as shown in FIG. 10, coolant storage 1002 can be coupled to a first valve 1004 that controls flow of coolant to a line associated with a pressure sensor 1006 (e.g., a pressure gauge, an electronic pressure sensor, etc.). In some embodiments, valve 1004 can be a manually controlled valve or an electronically controlled valve.

In some embodiments, a controller 1008 can be configured to control a second valve 1010 that can coupled between valve 1004 and cryogenic biopsy sampling device 100 to provide a controllable fluid connection between coolant storage 1002 and cryogenic biopsy sampling device 100. In some embodiments, coolant storage 1002 can be at a relatively high pressure (e.g., compared to atmospheric pressure) such that when valve 1010 is opened, coolant flows from coolant storage 1002 through tube 120 and into cryogenic biopsy sampling device 100. Additionally or alternatively, controller 1008 can be configured to control a pump that is configured to provide coolant at a particular pressure. In some embodiments, valve 1010 can be implemented using a pump.

In some embodiments, during a biopsy procedure, controller 1008 can control operation of valve 1010 to provide a continuous or intermittent flow of coolant through tip 104, which can then exit via arm 112 (e.g., which can be connected to a coolant collection system, not shown). In some embodiments, controller 1008 can be any suitable processor or combination of processors. For example, in some embodiments, controller 1008 can be implemented using one or more portions of computing device 820. As another example, controller 1008 can be an MCU and/or system on a chip that is configured (e.g., by firmware) to control operation of system 1000. Note that although an output $V_1$ is shown as controlling operation of valve 1010, this is merely an example, and valve 1010 can be controlled using any suitable technique or combination of techniques, such as through a low voltage digital signal, a wireless signal (e.g., an optical signal, a Bluetooth signal, an RF signal, etc.).

FIG. 11 shows an example of a control signal that can be used to control a portion of the system shown in FIG. 10 in accordance with some embodiments of the disclosed subject matter. As shown in FIG. 11, during a procedure, controller 1008 can provide coolant intermittently (e.g., from $t_0$ to $t_1$, and from $t_2$ to $t_3$), and can inhibit coolant from flowing into cryogenic biopsy sampling device 100 at other times (e.g., from $t_1$ to $t_2$). In some embodiments, providing an intermittent flow can allow the coolant entering the tip to rapidly expand, whereas when a continuous flow is provided, the speed at which coolant entering the tip expands may be limited due to the presence of coolant already present in the tip, thereby increasing the pressure within the tip and reducing expansion of the coolant. In various embodiments the coolant may be provided at intervals (e.g. the time from $t_0$ to $t_2$ in FIG. 11) of between 1 sec and 45 sec, between 10 sec and 30 sec, or between 15 sec and 25 sec, and may have a duration (e.g. the time from $t_0$ to $t_1$ or the time from $t_2$ to $t_3$ in FIG. 11) of between 1 sec and 30 sec, and the time from $t_0$ to $t_1$ may be the same or different from the duration from $t_1$ to $t_2$. For example, in some embodiments, the time from $t_0$ to $t_1$ can be shorter than the time from $t_1$ to $t_2$. In a more particular example, the time from $t_0$ to $t_1$ can be between 1 sec and 15 sec, or between 5 sec and 10 sec, and the time from $t_1$ to $t_2$ can be between 15 sec and 30 sec or between 10 sec and 20 sec. In one particular example, the time between $t_0$ to $t_1$ can be a relatively small fraction (e.g., on the order of one-tenth) of the time between $t_1$ to $t_2$. In one specific example, the time between $t_0$ to $t_1$ is 2 sec and the time from $t_1$ to $t_2$ is 18 sec.

Figures 12, 13:
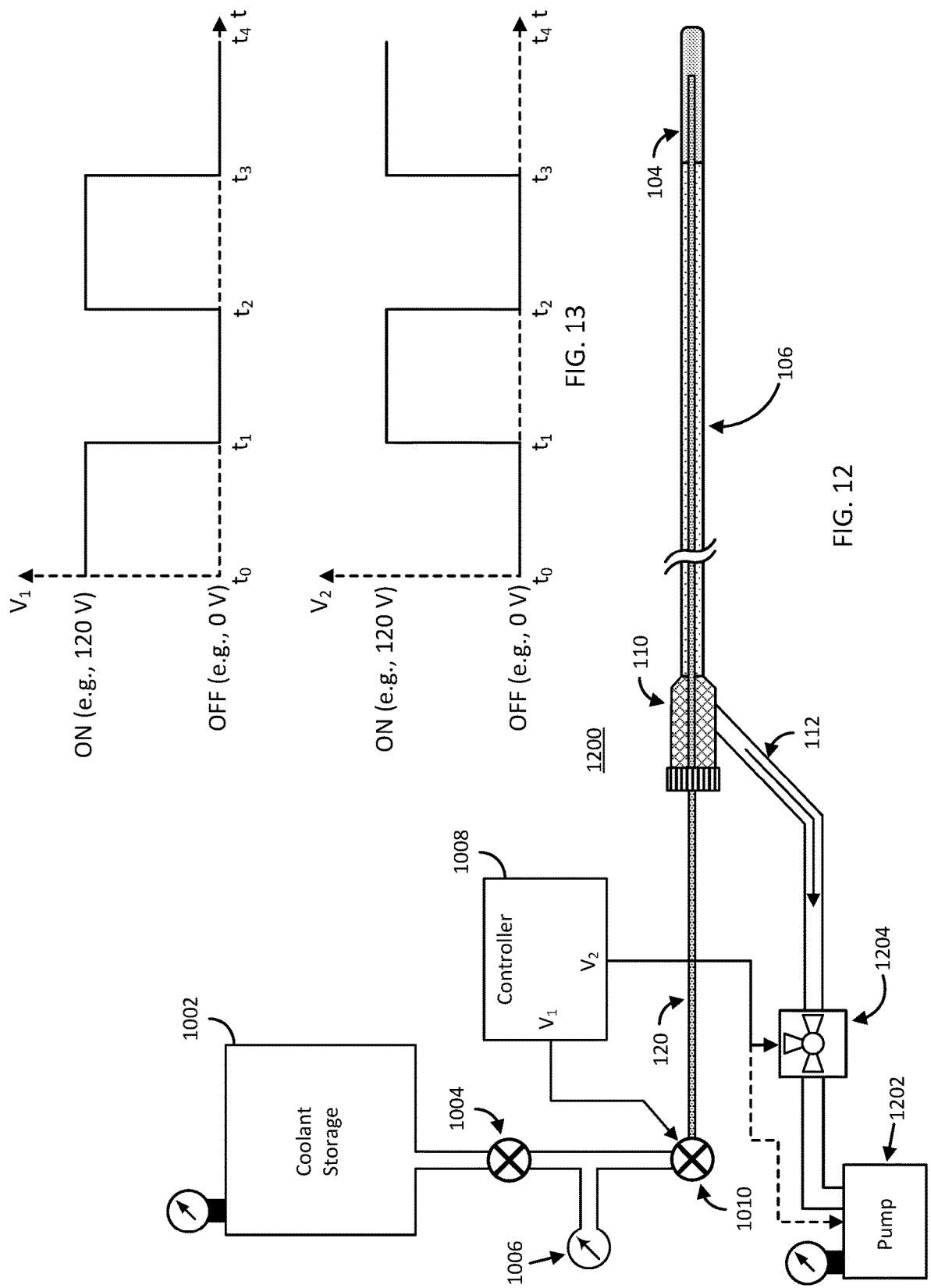
FIG. 12 shows an example of another system for cryogenic biopsy sampling in accordance with some embodiments of the disclosed subject matter.
FIG. 13 shows an example of control signals that can be used to control portions of the system shown in FIG. 12 in accordance with some embodiments of the disclosed subject matter.

FIG. 12 shows an example of another system 1200 for cryogenic biopsy sampling in accordance with some embodiments of the disclosed subject matter. As shown in FIG. 12, system 1200 is similarly configured to system 1000, but is further configured with a pump 1202 coupled to arm 112 via a valve 1204. In some embodiments, system 1200 can intermittently provide coolant to cryogenic biopsy sampling device 100, and can intermittently evacuate tip 104 of cryogenic biopsy sampling device 100 by opening valve 1204 and/or operating pump 1202. In some embodiments, pumping out coolant from tip 104 can allow for more rapid expansion than when coolant is allowed to flow freely at ambient pressure out of cryogenic biopsy sampling device 100. Note that although an output $V_2$ is shown as controlling operation of valve 1204, this is merely an example, and valve 1204 can be controlled using any suitable technique or combination of techniques, such as through a low voltage digital signal, a wireless signal (e.g., an optical signal, a Bluetooth signal, an RF signal, etc.).

FIG. 13 shows an example of control signals that can be used to control portions of the system shown in FIG. 12 in accordance with some embodiments of the disclosed subject matter. As shown in FIG. 13, during a procedure, controller 1008 can provide coolant intermittently (e.g., from $t_0$ to $t_1$, and from $t_2$ to $t_3$), and can inhibit coolant from flowing into cryogenic biopsy sampling device 100 at other times (e.g., from $t_1$ to $t_2$, and from $t_3$ to $t_4$). In various embodiments the coolant may be provided at intervals (e.g. the time from $t_0$ to $t_2$ in FIG. 13) of between 1 sec and 20 sec, or between 5 sec and 15 sec, and may have a duration (e.g. the time from $t_0$ to $t_1$ or the time from $t_2$ to $t_3$ in FIG. 13) of between 1 sec and 15 sec, or between 5 sec and 10 sec. Additionally, controller 1008 can evacuate cryogenic biopsy sampling device 100 using pump 1204 intermittently (e.g., from $t_1$ to $t_2$, and from $t_3$ to $t_4$). In various embodiments the coolant may be evacuated at intervals (e.g. one cycle being the time from $t_1$ to $t_3$ in FIG. 13) of between 1 sec and 45 sec, between 10 sec and 30 sec, or between 15 sec and 25 sec, and may have a duration (e.g. the time from $t_1$ to $t_2$ in FIG. 13) of between 15 sec and 30 sec or between 10 sec and 20 sec.

Figure 14:
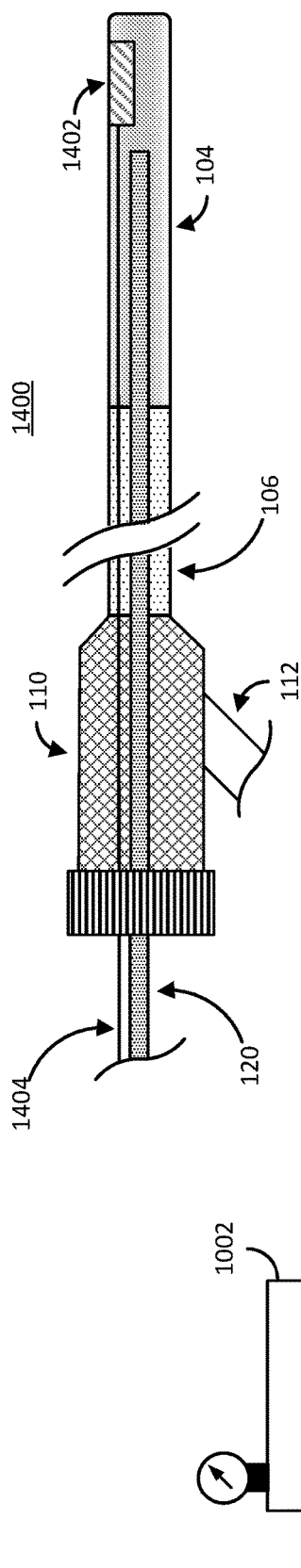
FIG. 14 shows an example of a device for cryogenic biopsy sampling with a temperature sensor at the distal end of the device in accordance with some embodiments of the disclosed subject matter.

FIG. 14 shows an example of a device 1400 for cryogenic biopsy sampling with a temperature sensor at the distal end of the device in accordance with some embodiments of the disclosed subject matter. As shown in FIG. 14, cryogenic biopsy sampling device 1400 can include a temperature sensor 1402 near tip 104 (e.g., temperature sensor 1402 can be integrated into tip 1402, affixed to the interior or exterior of tip 104, etc.). In some embodiments, temperature sensor 1402 can be implemented using any suitable technique or combination of techniques, such as with a micro-thermocouple. In some embodiments, temperature sensor 1402 can be coupled to a controller (e.g., controller 1008) via a wire 1404, and can generate an electrical signal that has a value that is reflective of the temperature near tip 104.

Figure 15:
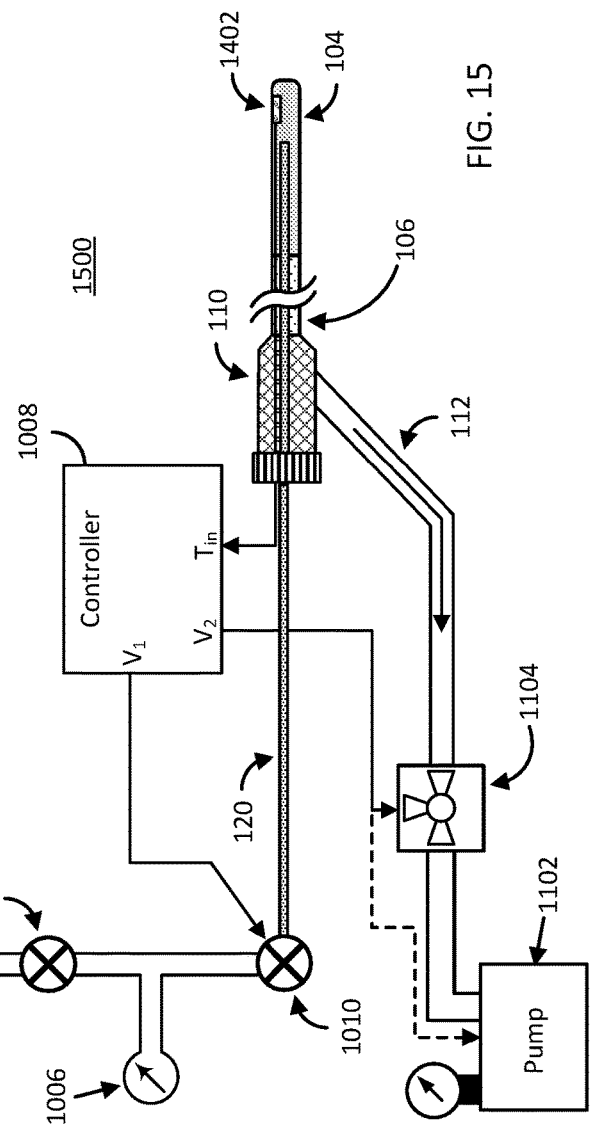
FIG. 15 shows an example of a system for cryogenic biopsy sampling that uses a temperature signal from the device for cryogenic biopsy sampling to control a portion of the system in accordance with some embodiments of the disclosed subject matter.

FIG. 15 shows an example of a system 1500 for cryogenic biopsy sampling that uses a temperature signal from the device for cryogenic biopsy sampling to control a portion of the system in accordance with some embodiments of the disclosed subject matter. As shown in FIG. 15, system 1500 is similarly configured to system 1200, but is further configured to receive a temperature signal ($T_{in}$) from temperature sensor 1402, which can be used to control the duty cycle of $V_1$ and $V_2$. In some embodiments, controller 1008 can monitor the change in temperature over time, and can increase or decrease the frequency and/or duty cycle of the control signals to increase or decrease the rate of cooling. For example, in an area with relatively high heat capacity (e.g., a fluid-filled area such as the stomach or duodenum), the frequency of the control signals can be increased to speed cooling of the tip. As another example, in an area with relatively low heat capacity (e.g., an area with relatively low fluid levels such as the esophagus), the frequency of the control signals can be decreased to slow cooling of the tip, which can reduce the risk of bleeding when a tissue sample is removed.

Figure 16:
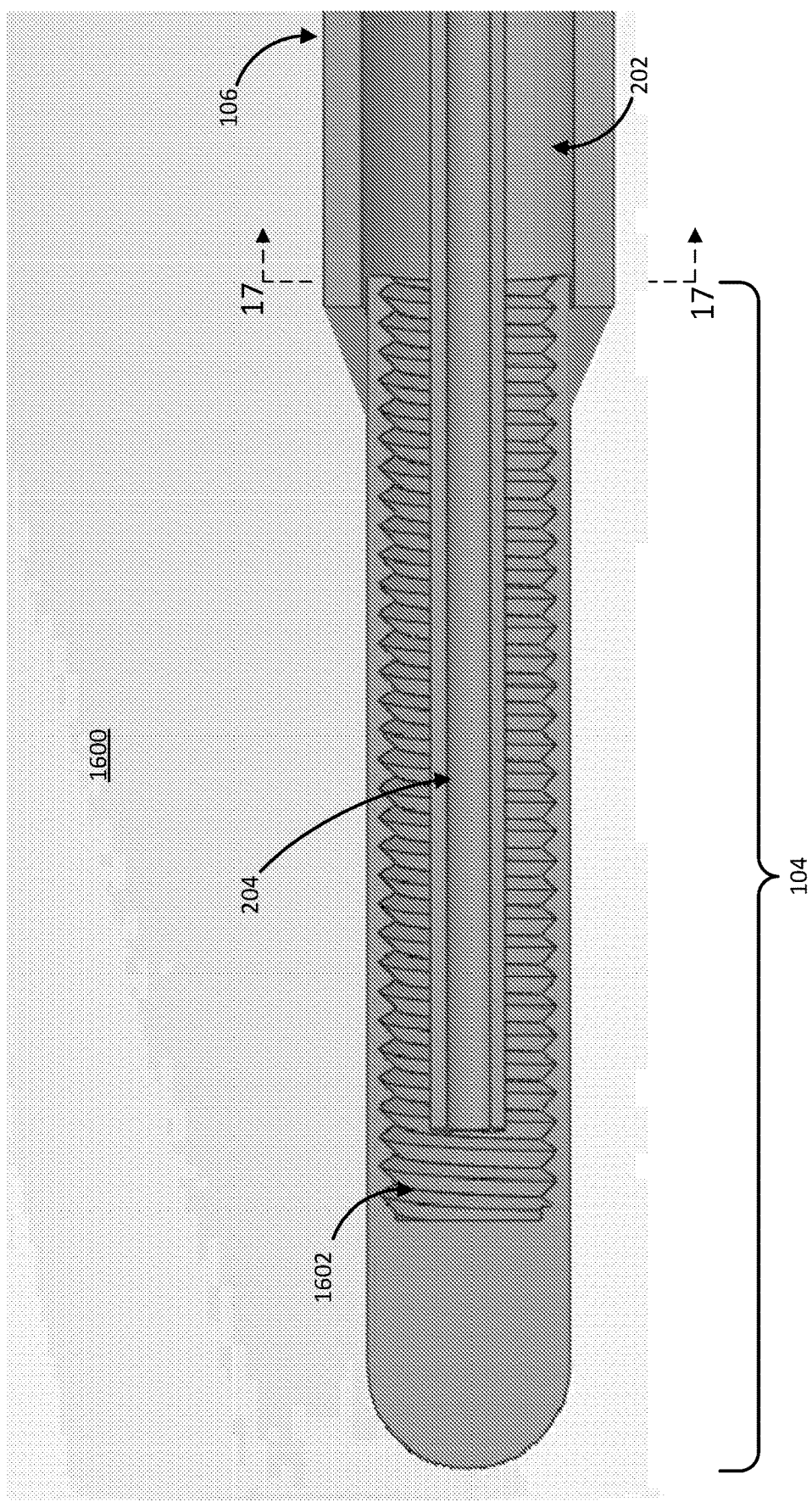
FIG. 16 shows an example of a distal end of a device for cryogenic biopsy sampling in accordance with some embodiments of the disclosed subject matter.

FIG. 16 shows an example 1600 of a distal end of a device for cryogenic biopsy sampling in accordance with some embodiments of the disclosed subject matter. As shown in FIG. 16, inner tube 204 can protrude into a cavity within tip 104 to provide a relatively long path between the distal end of inner tube 204 and outer tube 202. Additionally, in some embodiments, an inner surface of tip 104 can be textured to increase the surface area of tip 104 that is exposed to coolant during operation and/or to provide protrusions that cause turbulence in the flow of coolant (e.g., at low Reynolds numbers), which can increase thermal contact between the coolant and the interior surface of the tip and/or can increase heat transfer away from the tip through convection, replacing warmed coolant at the interior surface of tip 104 with cooler coolant. For example, as shown in FIG. 16, the inner surface of tip 104 can be machined (e.g., using a tap) to form threads 1602 on the inner surface of tip 104. Note that this is merely an example of texture that can be created on the interior surface of tip 104, and other forms of texture can also be used, such as longitudinal lines, rifling (e.g., helical spirals), pitting, embossing a pattern, etc. In some embodiments, tip 104 can be fabricated from any suitable starting material using any suitable technique or combination of techniques. For example, in some embodiments, tip 104 can be machined from a slug of metal. As another example, tip 104 can be die cast, injection molded (e.g., using fusible core injection molding techniques), 3D printed, etc.

FIG. 17 shows an example of a cross-sectional view of distal end 1600 shown in FIG. 16 in accordance with some embodiments of the disclosed subject matter. As shown in FIG. 17, coolant can flow out of inner tube 204, through tip 104, and into outer tube 202 through an annular aperture 1702.

FIG. 18 shows an example 1800 of another distal end of a device for cryogenic biopsy sampling in accordance with some embodiments of the disclosed subject matter. As shown in FIG. 18, distal end 1800 can be configured similarly to distal end 1600 but can include a throttle element 1802 that can reduce the rate at which coolant can flow out of tip 104. In some embodiments, the spacing between the outer diameter of inner tube 204 and the inner diameter of throttle element 1802 can be on the order of 50 µm to 100 µm. For example, the inner diameter of throttle element 1802 can be about 700 µm to about 800 µm, and the outer diameter of inner tube 204 can be about 600 µm to about 750 µm.

FIG. 19 shows an example of a cross-sectional view of distal end 1800 shown in FIG. 18 in accordance with some embodiments of the disclosed subject matter. As shown in FIG. 19, the annular area 1902 through which coolant can flow from tip 104 into outer tube 202 is much smaller than the annular area 1702. In some instances the coolant may flow out of tip 104 relatively quickly, before the coolant has absorbed as much heat from tip 104 as possible, reducing the efficiency of heat transfer per unit (e.g. unit volume) of coolant. Thus, in some embodiments, throttling element 1802 can be introduced, e.g. at the junction between dual lumen tube 106 and tip 104, to reduce a flow rate of coolant out of tip 104 and increase the contact time between the expanding/expanded coolant and the interior surface of tip 104. This in turn can increase cooling efficiency per volume of coolant introduced into tip 104.

Figure 20:
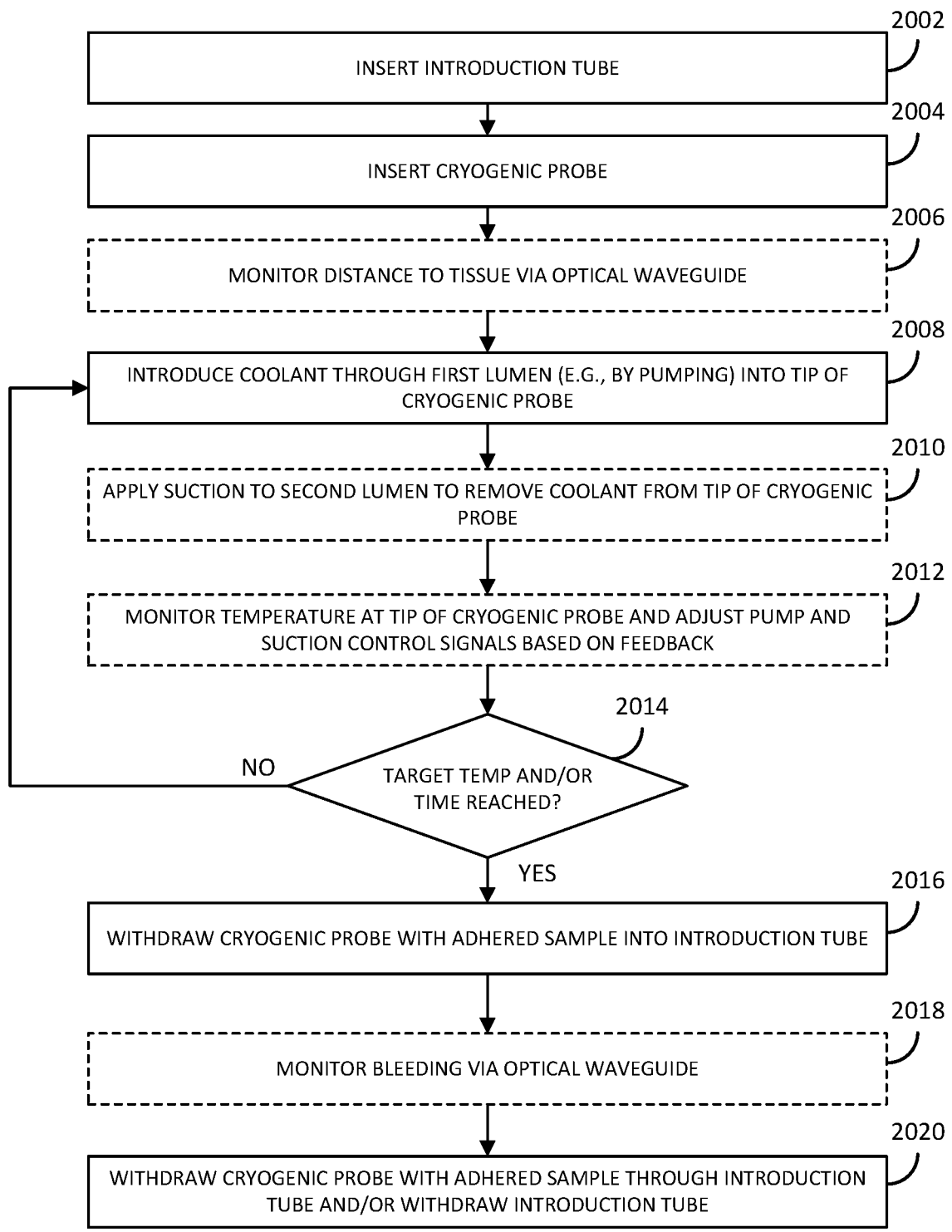
FIG. 20 shows an example of a process for cryogenic biopsy sampling in accordance with some embodiments of the disclosed subject matter.
Figure 21:
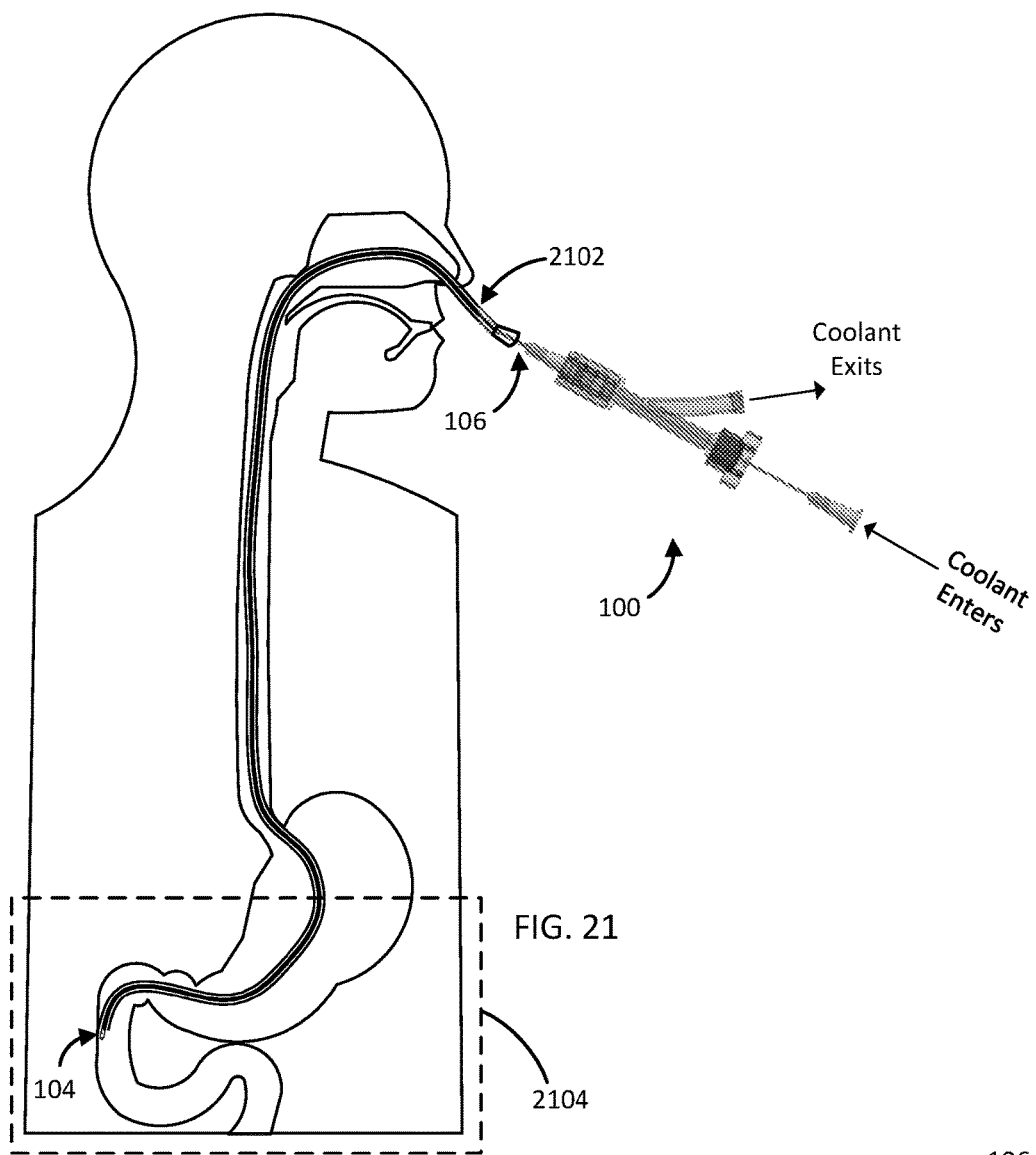
FIG. 21 shows an example of a device for cryogenic biopsy sampling that is inserted into a subject's duodenum through a nasogastric tube in accordance with some embodiments of the disclosed subject matter.

FIG. 20 shows an example of a process for cryogenic biopsy sampling in accordance with some embodiments of the disclosed subject matter. As shown in FIG. 20, process 2000 can begin at step 2002 with insertion of an introduction tube into a location from which a tissue sample is to be taken. For example, if a procedure to collect a tissue sample of a subject's duodenum is being performed, a nasogastric tube can be inserted through the subject's nasal cavity and gastrointestinal system until it reaches the duodenum (e.g., as shown in FIG. 21). In some embodiments, an introduction tube may already be in place (e.g., if the subject already has a nasogastric tube in place) and 2002 can be omitted. In some embodiments, the introduction tube can be positioned with a distal end near the tissue to be collected using any suitable technique or combination of techniques, such as by positioning the end of the insertion tube (e.g., marked by a radiopaque marker(s)) with the assistance of x-ray imaging. As another example, the introduction tube can be positioned with the aid of optical imaging (e.g., via a fiber bundle endomicroscope inserted with the introduction tube), after which the optical imager may be withdrawn.

At step 2004, process 2000 can include insertion of a cryogenic probe (e.g., cryogenic probe 102) through the introduction tube to the site at which the tissue is to be collected.

At step 2006, process 2000 can include monitoring a distance from the tip of the cryogenic probe to tissue via an optical waveguide. For example, as described above in connection with FIG. 4, an OCT imaging system can be used to emit light from an optical fiber associated with the cryogenic biopsy sampling device, and can measure the distance to the tissue by determining which wavelength the returning light interacts with to create constructive interference. In some embodiments, a single A-scan (i.e., a scan in only the depth direction) can be performed by the OCT imaging system, and based on the pattern of the backscattering profile, the distance can be calculated and/or displayed (e.g., on display 804 of the imaging system or display 824 of a computing device in communication with the imaging system). In some embodiments, step 2006 can be omitted, such as in cases in which the cryogenic biopsy sampling device being used does not have the capability, or is not configured, to detect a distance between the tip of the cryogenic probe and tissue.

At step 2008, process 2000 can include introducing coolant through the first lumen (e.g., inner tube 204) of the cryogenic probe (e.g., by pumping or from a pressurized container) into the tip of the cryogenic probe. As described above in connection with FIGS. 10, 12, and 15, in some embodiments, a controller can automatically (i.e., without user intervention) control flow of coolant into the cryogenic biopsy sampling device (e.g., by controlling a pump and/or valve) to intermittently introduce coolant into the tip of the cryogenic probe. As described below in connection with FIG. 38, in some embodiments, while coolant is being introduced into the tip of the cryogenic probe a state of one or more valves can be monitored (e.g., via a feedback component), and if one of the valves malfunctions (e.g., by failing to close), process 2000 can end by causing one or more other valves to close, inhibiting further flow of coolant in to the tip. Additionally, as described below in connection with FIG. 39, in some embodiments, while coolant is being introduced into the tip of the cryogenic probe, a flow of coolant out of the tip can be monitored to detect whether a leak has occurred. For example, if a leak occurs the amount of coolant, and consequently the flow of coolant, out of the tip will fall as a portion of the coolant escapes through the leak. If a leak is detected (e.g., based on a reduced flow), process 2000 can end by causing one or more other valves to close, inhibiting further flow of coolant in to the tip.

At step 2010, process 2000 can include applying suction to a second lumen to remove coolant from the tip of the cryogenic probe. As described above in connection with FIGS. 12 and 15, evacuating the tip of the cryogenic probe before introducing more coolant can increase the cooling efficiency by allowing the newly introduced coolant to expand to a greater degree and/or to expand more rapidly, causing a greater cooling effect and improving efficiency. In some embodiments, step 2010 can be omitted and coolant can be allowed to flow out of the tip of the cryogenic probe freely (e.g., into a coolant recovery system through arm 112).

At step 2012, process 2000 can include monitoring the temperature at the tip of the cryogenic probe and adjusting the frequency and/or duty cycle of the control signals to increase or decrease the rate of cooling based on temperature feedback. For example, as described above in connection with FIGS. 14 and 15, a temperature sensor can be incorporated into the cryogenic probe, and based on the temperature signal a controller can act to increase or decrease the rate of cooling. In some embodiments, step 2012 can be omitted, such as in cases in which the cryogenic biopsy sampling device being used does not have the capability, or is not configured, to detect temperature near the tip of the cryogenic probe.

At step 2014, process 2000 can include determining whether a target probe temperature and/or time have been reached. For example, in some embodiments, to reduce the risk of bleeding when removing a sample that is adhered to the tip of the cryogenic probe, the probe can be exposed to the tissue for a particular period of time (e.g., on the order of 20 to 30 seconds) before removing the sample. As another example, when the temperature of the tip is being monitored, coolant can continue to be cycled through the tip until a particular threshold temperature is reached. This can insure that the target temperature is reached before withdrawing the probe; it may be important to ascertain that the target temperature has been reached before withdrawing when the environment of the sample (e.g. a fluid-containing environment) may slow the rate of cooling. In some embodiments, when coolant is introduced at 2008 and/or when a target has been reached at 2014, process 2000 can cause additional manual and/or automatic activation of cooling to be inhibited for at least a predetermined amount of time (e.g., one minute, two minutes, five minutes, etc.). In some embodiments, such a lock out procedure can prevent prolonged cooling that may cause unintended damage to tissue.

If the target temperature and/or time has not been reached ("NO" at step 2014), process 2000 can return to step 2008 to continue to intermittently introduce coolant into the cryogenic probe. In some embodiments, a determination of whether the target time and/or temperature has been reached can be automatically carried out (e.g., by controller 1008, imaging device 402, and/or computing device 820, which may include common components, without user intervention), and an alert can be presented to alert an operator that the sample can be extracted. Additionally or alternatively, in some embodiments, a determination of whether the target time and/or temperature has been reached can be made manually (e.g., by an operator), with or without the aid of information provided by the system (by controller 1008, imaging device 402, and/or computing device 820, which may include common components). Otherwise, if the target temperature and/or time has been reached ("YES" at step 2014), process 2000 can move to step 2016.

At step 2016, process 2000 can include withdrawing the cryogenic probe with an adhered tissue sample into the introduction tube. For example, the cryogenic probe can be manually withdrawn from the proximal end to remove the adhered tissue from the biopsy site.

At step 2018, process 2000 can include monitoring bleeding at the sample site via an optical waveguide. For example, in some embodiments, as described above in connection with FIGS. 5, 7, and 9, light at multiple wavelengths can be emitted from an optical fiber near the tip of the cryogenic probe, and changes in the ratio of absorption can be monitored to detect the presence of blood, which can indicate that harvesting of the sample caused hemorrhaging. In some embodiments, step 2018 can be omitted, such as in cases in which the cryogenic biopsy sampling device being used does not have the capability, or is not configured, to detect the presence of blood near the tip of the cryogenic probe.

At step 2020, process 2000 can include withdrawing the cryogenic probe with the adhered tissue sample through the introduction tube and/or withdrawing the introduction tube. For example, the cryogenic probe can be withdrawn through the nasogastric tube through which it was inserted to remove the tissue sample. In some embodiments, coolant can be provided intermittently (e.g., as described above in connection with step 2008 and FIGS. 10-15) while withdrawing the sample to reduce the chance that the tip will lose adhesion to the tissue sample during withdrawal (e.g., due to heating during removal).

In some embodiments, after removing the sample, the tissue sample can be collected for analysis. For example, a histology paper can be placed between the tissue sample that is adhered to the tip of the cryogenic probe and a warming pad to thaw the tissue and induce a loss of adhesion. The tissue sample can be wrapped in the histology paper after removal of the tissue sample from the tip, which can help maintain the orientation of the tissue. The wrapped tissue can then be fixed, for example by placing the wrapped tissue sample in formalin, before transferring the sample for analysis (e.g., by mounting and sectioning the sample for histopathological examination).

Figure 22:
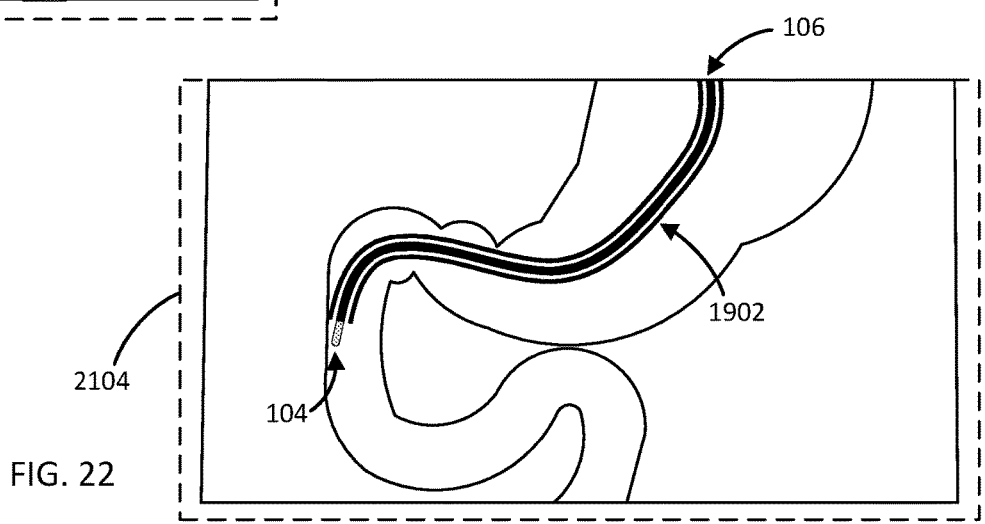
FIG. 22 shows an example of an expanded view of a portion of FIG. 21.

FIG. 21 shows an example of a device for cryogenic biopsy sampling that is inserted into a subject's duodenum through a nasogastric tube in accordance with some embodiments of the disclosed subject matter. As shown in FIG. 21, cryogenic probe 102 (e.g., including dual lumen tube 106 and tip 104) is inserted into a subject's duodenum through a nasogastric tube 2102. FIG. 22 shows an example of an enlarged view of portion 2104 of FIG. 21.

FIG. 23 shows examples of optical coherence tomography data that can be used to determine a distance from a tip of a device for cryogenic biopsy sampling to tissue in accordance with some embodiments of the disclosed subject matter. As shown in 2302, when the tip of a cryogenic probe associated with an optical fiber is not in contact with tissue, a band can be seen in an M-mode OCT image generated by performing an A-scan through the optical fiber, where the width of the band corresponds to the gap between the tip and the tissue. As shown in 2304, when the tip is in contact with tissue, the band corresponding to the distance between the tip and the tissue decreases.

Figure 24:
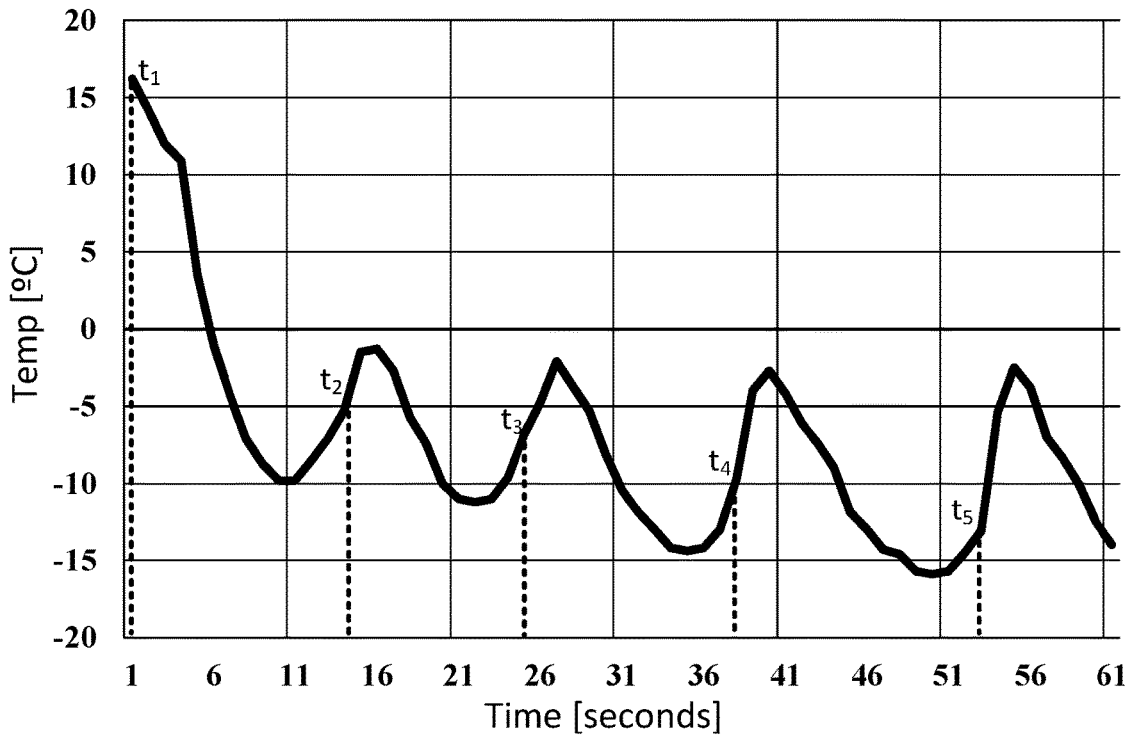
FIG. 24 shows an example chart illustrating the temperature of a tip for a device for cryogenic biopsy sampling implemented in accordance with some embodiments of the disclosed subject matter observed over time in response to repeated introduction of a coolant into the tip.

FIG. 24 shows an example chart illustrating the temperature of a tip for a device for cryogenic biopsy sampling implemented in accordance with some embodiments of the disclosed subject matter observed over time in response to repeated introduction of a coolant into the tip. The chart shown in FIG. 24 represents the temperature changes of a 2 mm external diameter tip of a cryogenic probe with a smooth interior surface (i.e., lacking texture such as the threading shown in FIGS. 16 and 18) when $CH_2FCF_3$ (marketed as Freon® 134a by the Chemours Company headquartered in Wilmington, Delaware, and sometimes referred to as R-134a) was pumped into the tip at times $t_1$, $t_2$, $t_3$, $t_4$, and $t_5$. As shown in FIG. 24, the tip initially chilled from about 16° C. to about −10° C. after a first introduction of coolant at time $t_1$, after which the temperature began to increase until after coolant was again introduced into the tip at time $t_2$. A similar pattern of cooling and warming is evident after each cycle of pumping.

Figure 25:
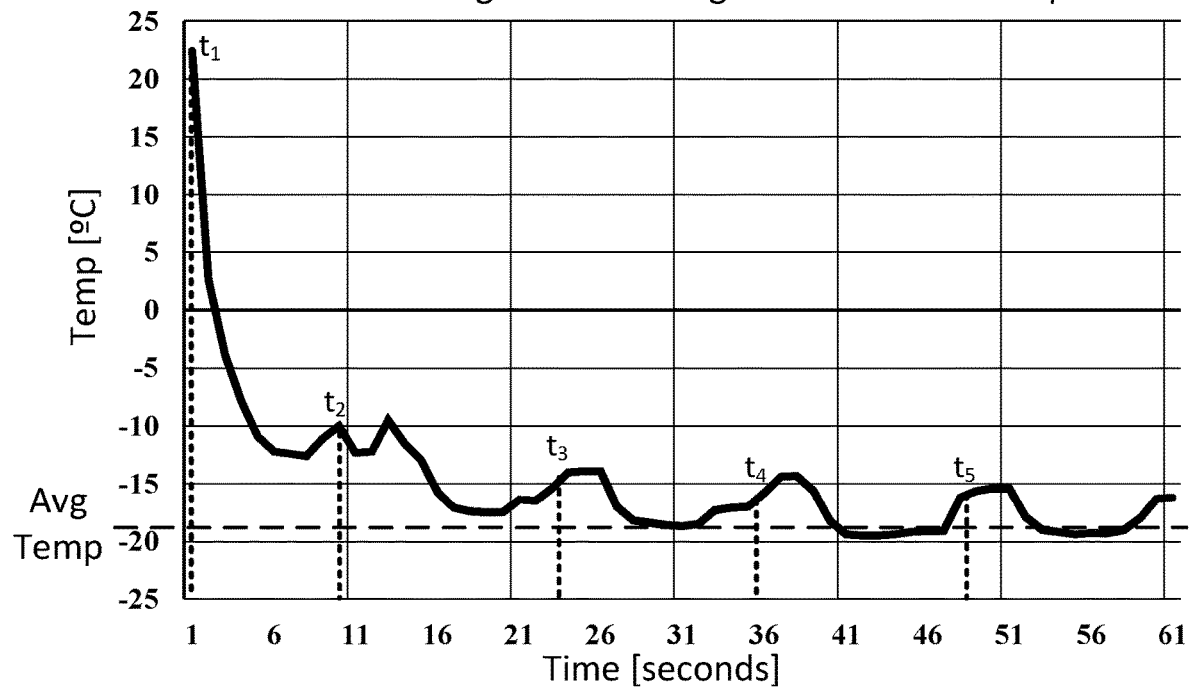
FIG. 25 shows an example chart illustrating the temperature of another tip for a device for cryogenic biopsy sampling implemented in accordance with some embodiments of the disclosed subject matter observed over time in response to repeated introduction of a coolant into the tip.

FIG. 25 shows an example chart illustrating the temperature of another tip for a device for cryogenic biopsy sampling implemented in accordance with some embodiments of the disclosed subject matter observed over time in response to repeated introduction of a coolant into the tip. The chart shown in FIG. 25 represents the temperature changes of a 2 mm tip of a cryogenic probe with a threaded interior surface (e.g., as shown in FIGS. 16 and 18) when $CH_2FCF_3$ (R-134a) was pumped into the tip at times $t_1$, $t_2$, $t_3$, $t_4$, and $t_5$. As shown in FIG. 25, the tip initially chilled from about 22° C. to about −12° C. after a first introduction of coolant at time $t_1$, after which the temperature began to slowly increase until coolant was again introduced into the tip at time $t_2$. The same pattern of cooling and slow warming is evident after each cycle of pumping in FIG. 25. Note that in the example of FIG. 25, the cooling was achieved more rapidly than in the example of FIG. 24 (which was performed using a probe tip without internal texture such as threading), the tip rewarmed at a slower rate between infusions of coolant, and the temperature was maintained at around −18° C. while coolant was being regularly infused (rather than the relatively large temperature changes of FIG. 24).

Figure 26:
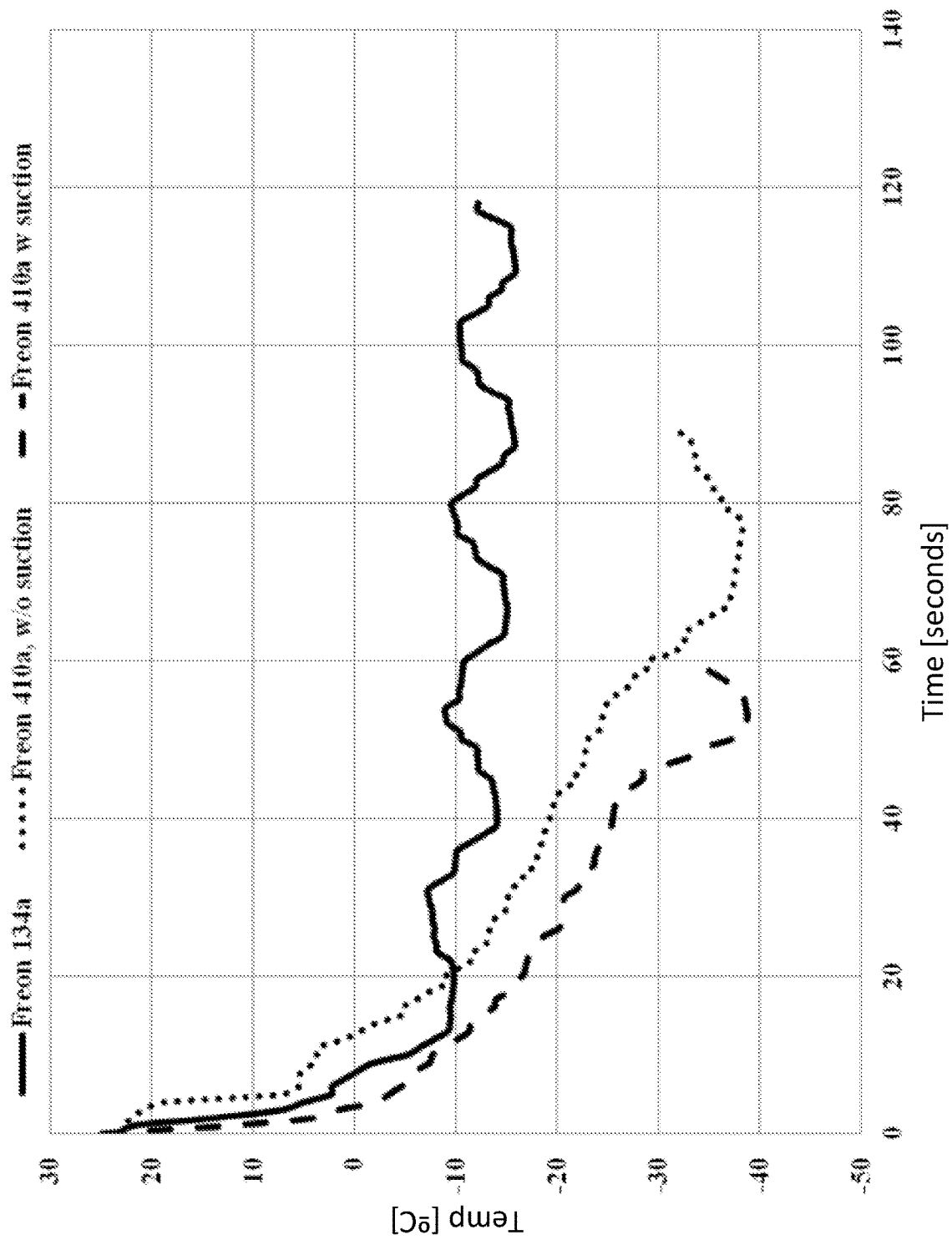
FIG. 26 shows an example chart illustrating a comparison of temperatures of a tip for a device for cryogenic biopsy sampling implemented in accordance with some embodiments of the disclosed subject matter observed over time in response to introduction of different coolants into the tip.

FIG. 26 shows an example chart illustrating a comparison of temperatures of a tip for a device for cryogenic biopsy sampling, implemented in accordance with some embodiments of the disclosed subject matter, observed over time in response to introduction of different coolants into the tip. The chart shown in FIG. 26 represents the temperature changes of a 1.5 mm tip of a cryogenic probe with a threaded interior surface (e.g., as shown in FIGS. 16 and 18) and a throttle element (e.g., throttle element 1802 shown in FIG. 18) when $CH_2FCF_3$ (R-134a) or a mixture of $CH_2F_2$ and $CHF_2CF_3$ (marketed as Freon® 410a by the Chemours Company and sometimes referred to as R-410a) was pumped into the tip once near time zero, and in one case when the coolant was suctioned out of the tip. As shown in FIG. 26, cooling with R-134a reached a minimum temperature of about −16° C., while cooling with R-410a reached a substantially lower minimum temperature of about −38° C., and reached that lower temperature in about ten seconds less time when the coolant was evacuated from the tip using suction between infusions. As shown in FIG. 26, a single cycle of pumping R-410a caused a longer period of cooling before the temperature began to rise compared to R-134a, and pumping R-410a at regular intervals (e.g., at time intervals longer than those shown in FIGS. 24 and 25) can result in a similar (but with a slower time course) pattern of temperature increases and decreases to those shown for R-134a.

Figure 27:
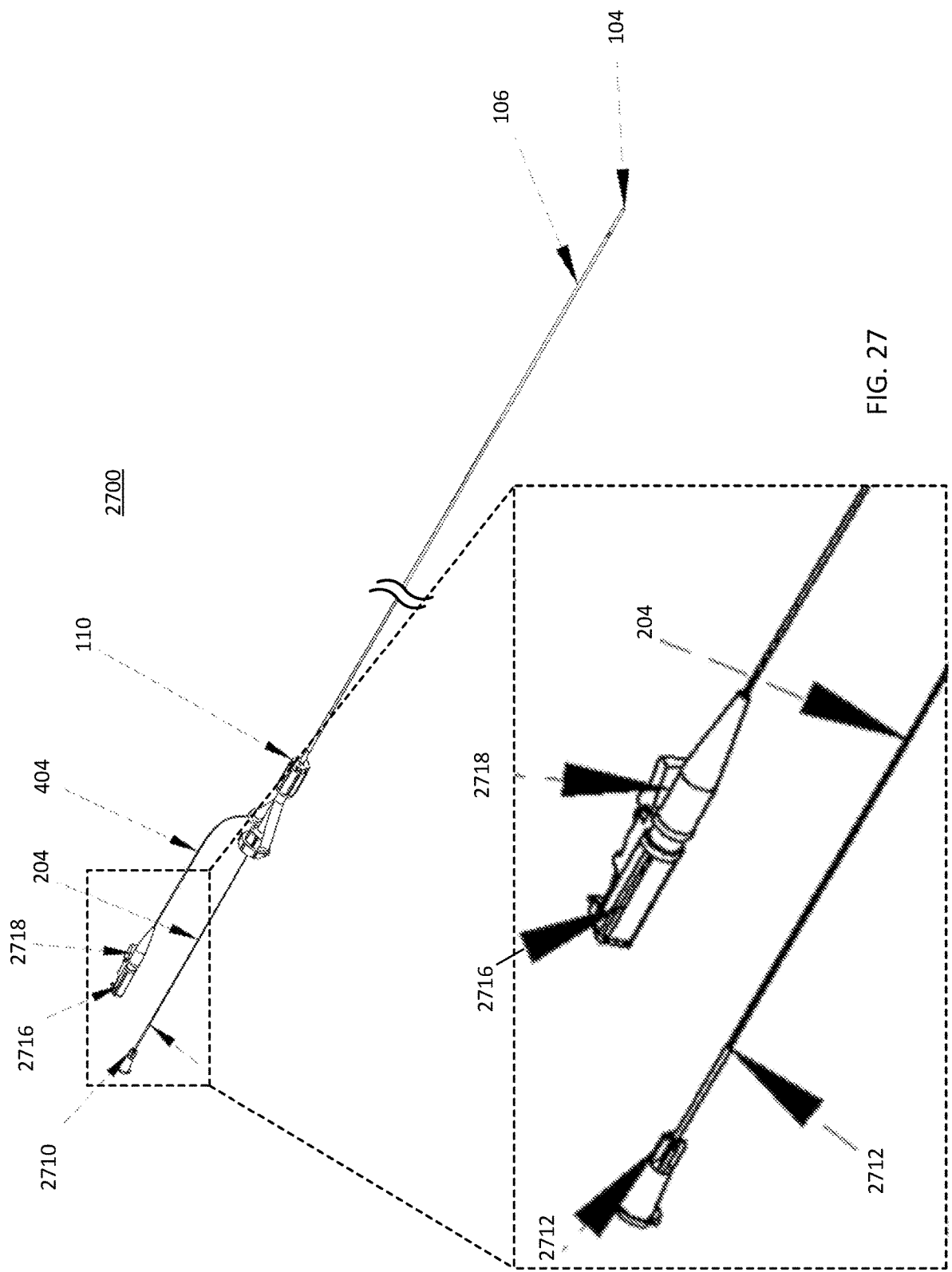
FIG. 27 shows an example of another device for cryogenic biopsy sampling in accordance with some embodiments of the disclosed subject matter.

FIG. 27 shows an example 2700 of another device for cryogenic biopsy sampling in accordance with some embodiments of the disclosed subject matter. As shown in FIG. 27, device 2700 can be implemented similarly to device 500. In some embodiments, device 2700 can also include a strain relief device 2712 coupled to a Luer lock connector 2710 and inner tube 204. In some embodiments, an optical fiber connector 2716 can be coupled to optical fiber 404 via a strain relief element 2718.

Figure 28:
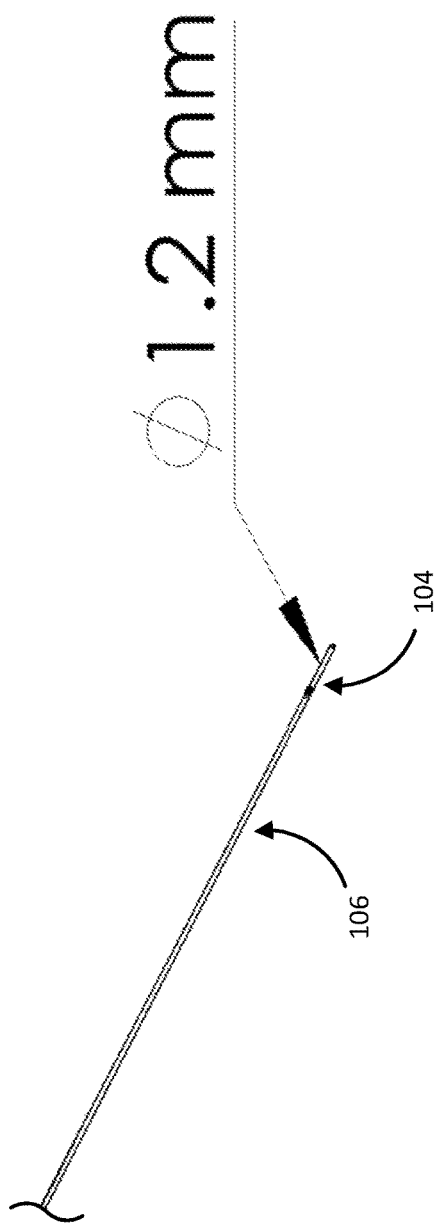
FIG. 28 shows an example diameter of the tip of the device of FIG. 27 in accordance with some embodiments of the disclosed subject matter.

FIG. 28 shows an example diameter of the tip of the device of FIG. 27 in accordance with some embodiments of the disclosed subject matter. As shown, the external diameter of tip 104 can be about 1.2 mm.

Figure 29:
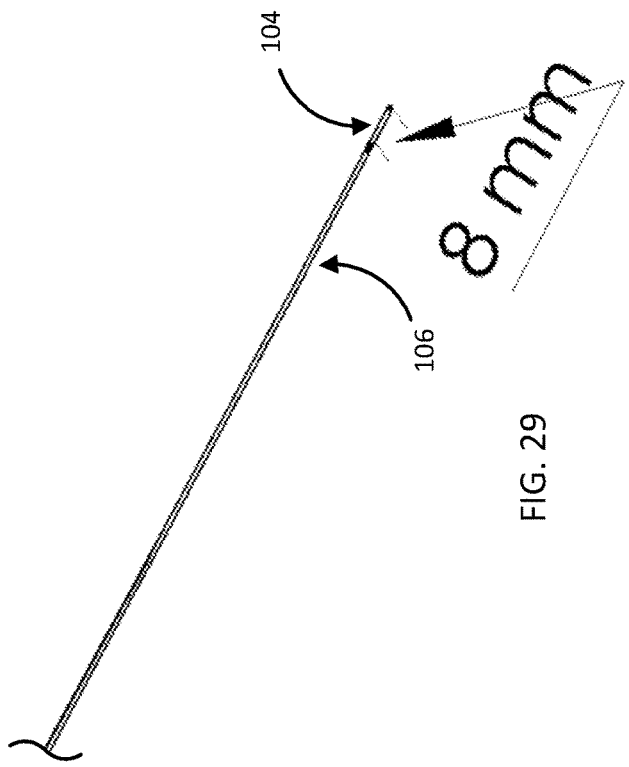
FIG. 29 shows an example exposed length of the tip of the device of FIG. 27 in accordance with some embodiments of the disclosed subject matter.

FIG. 29 shows an example exposed length of the tip of the device of FIG. 27 in accordance with some embodiments of the disclosed subject matter. As shown, the exposed length of tip 104 can be about 8 mm.

Figure 30:
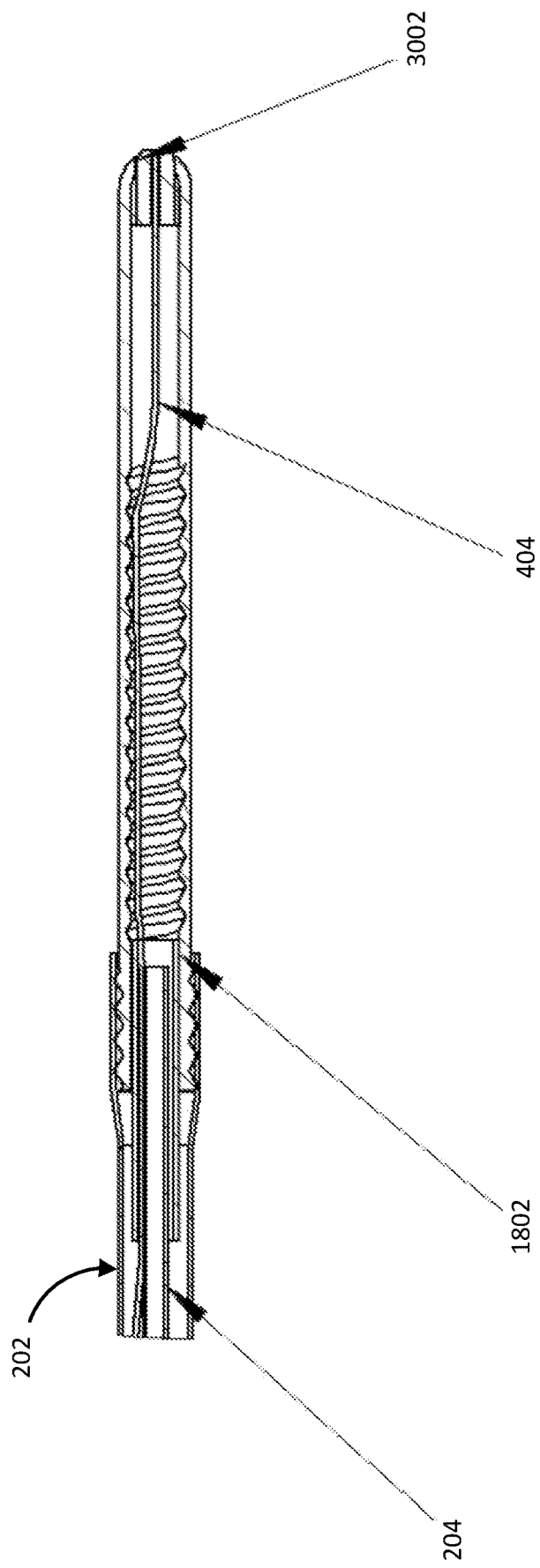
FIG. 30 shows an example of yet another distal end of a device for cryogenic biopsy sampling in accordance with some embodiments of the disclosed subject matter.

FIG. 30 shows an example of yet another distal end of a device for cryogenic biopsy sampling in accordance with some embodiments of the disclosed subject matter. As shown in FIG. 30, optical fiber 404 can pass through outer tube 202 and into tip 104 through throttle element 1802. In some embodiments, the distal end of optical fiber 404 can be secured within a ferrule 3002 that is disposed within tip 104. In some embodiments, ferrule 3002 can be made from any suitable material, such as glass or ceramic. The use of the ferrule 3002 provides a secure and stable connection for the optical fiber 404 at the tip 104.

Figure 31:
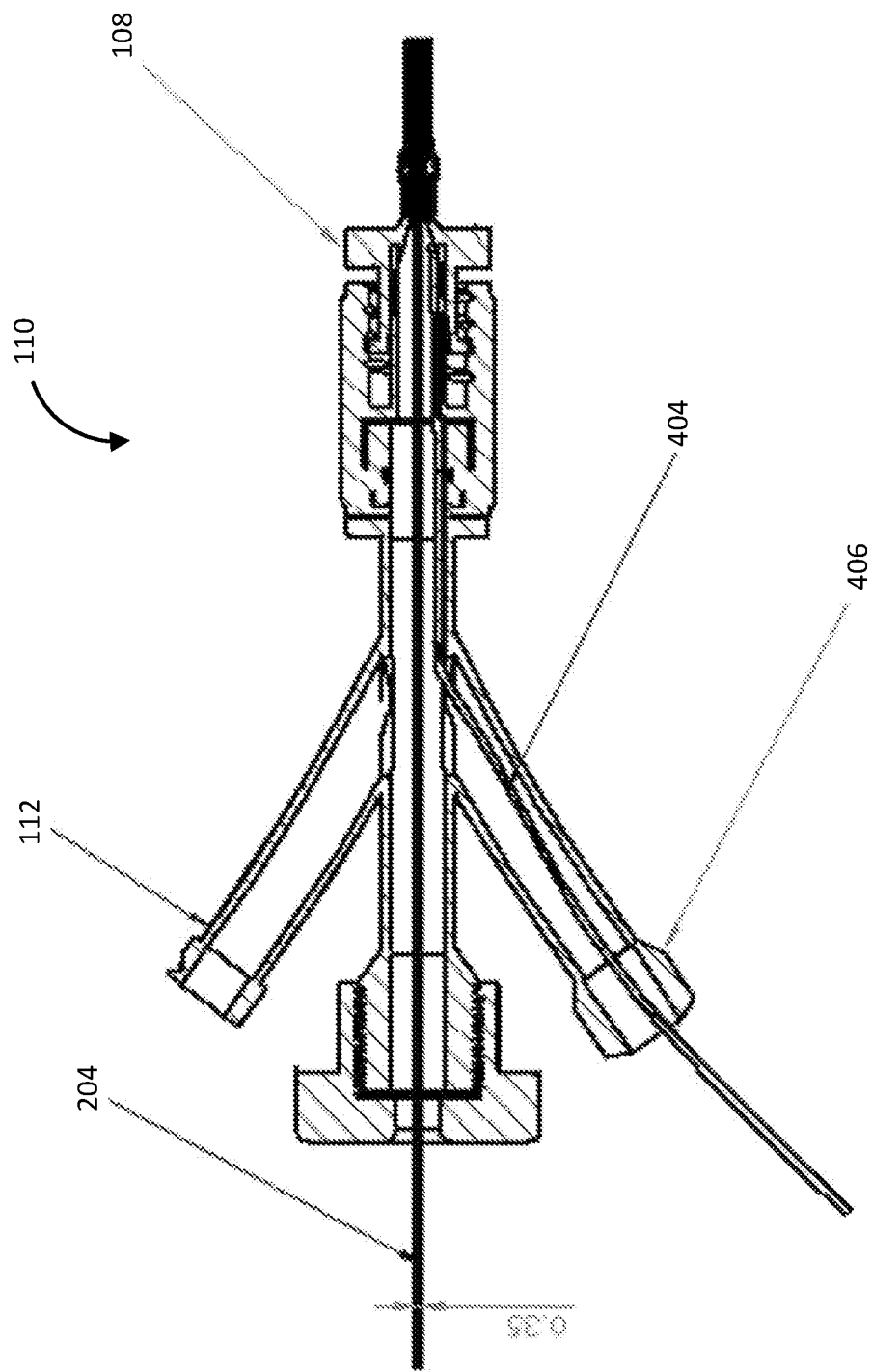
FIG. 31 shows an example of a housing that can be used with a device for cryogenic biopsy sampling in accordance with some embodiments of the disclosed subject matter.

FIG. 31 show a cross-sectional view of an example of a housing 110 that can be used with a device for cryogenic biopsy sampling in accordance with some embodiments of the disclosed subject matter.

Figure 32:
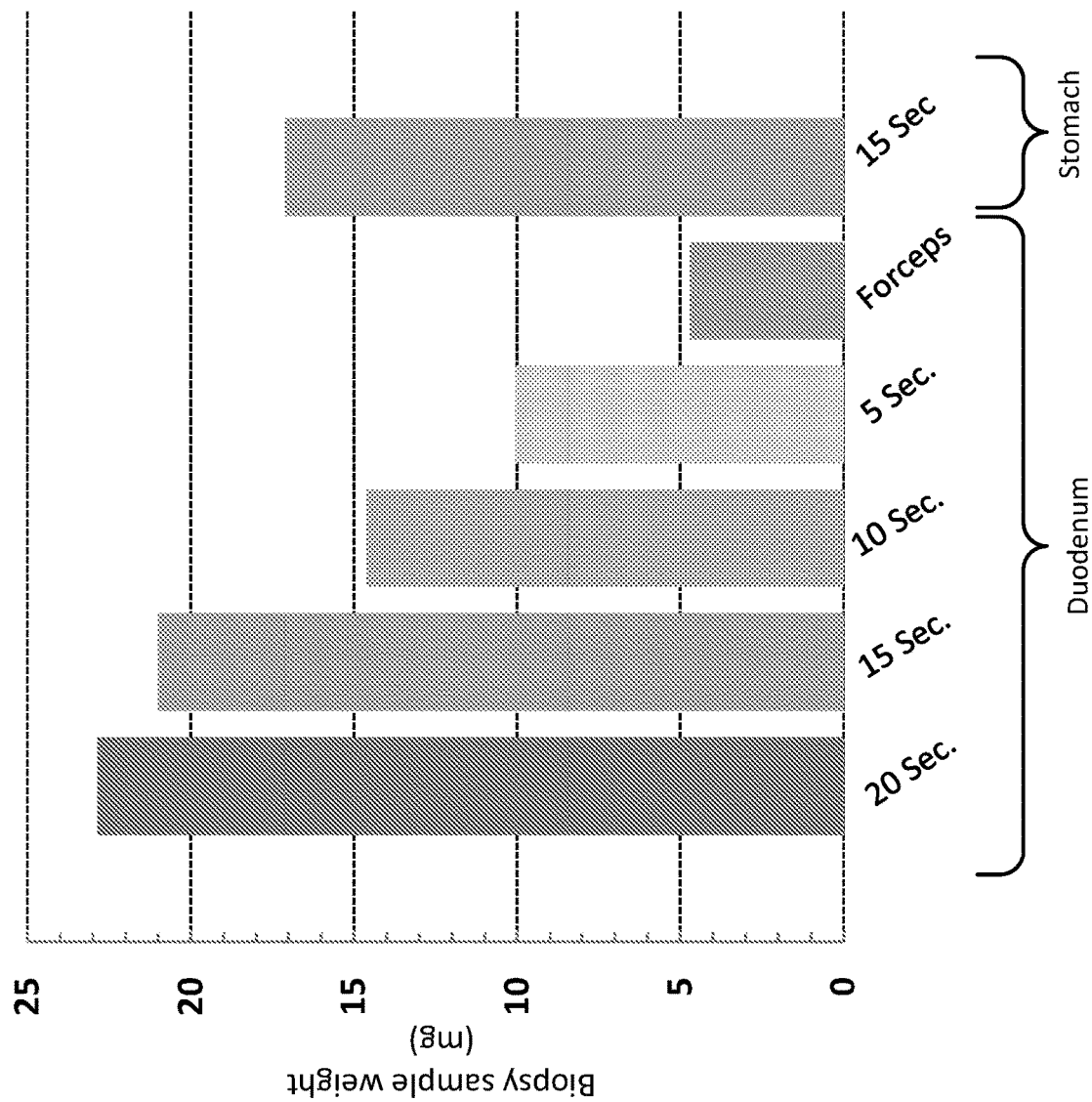
FIG. 32 shows an example of a chart illustrating comparative biopsy samples obtained using different techniques in accordance with some embodiments of the disclosed subject matter.

FIG. 32 shows an example of a chart illustrating comparative biopsy samples obtained using different techniques in accordance with some embodiments of the disclosed subject matter. The samples were collected in vivo from swine. As shown in FIG. 32, the sample collected via forceps using conventional techniques was smaller than the samples collected using a device for cryogenic biopsy sampling applied to tissue in the duodenum for various lengths of time, or applied to tissue in the stomach.

Figure 33:
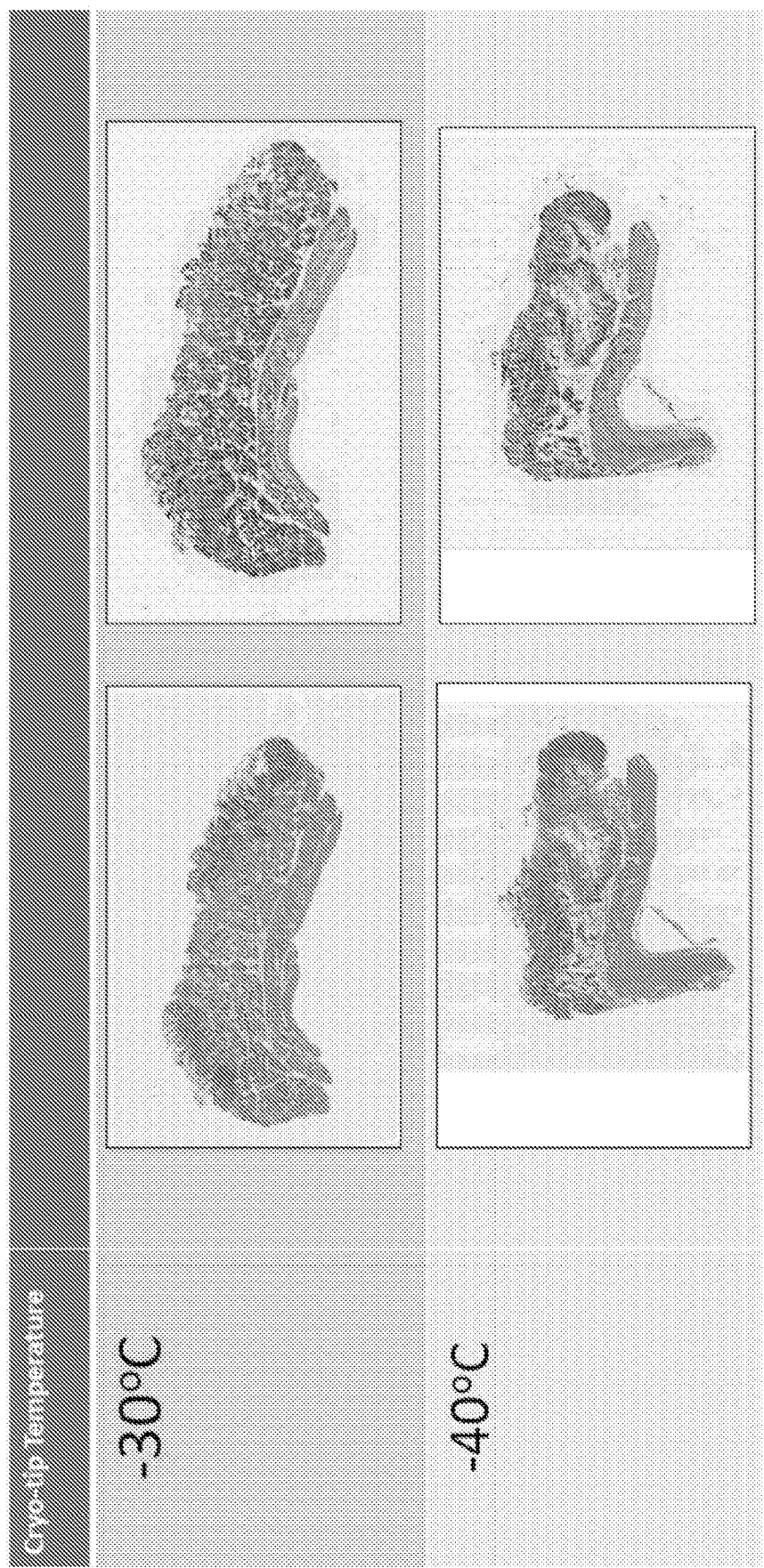
FIG. 33 shows an example of sectioned tissue samples collected using devices implemented in accordance with some embodiments of the disclosed subject matter.

FIG. 33 shows examples of sectioned ex-vivo tissue samples collected using devices implemented in accordance with some embodiments of the disclosed subject matter.

FIGS. 34A-34C show a prior art cryoprobe (FIG. 34A), a close up of the tip of the prior art cryoprobe (FIG. 34B), and a close-up view of the tip of the prior art cryoprobe next to a length scale (FIG. 34C).

FIG. 35 shows a table illustrating a comparison between features of the prior art cryoprobe of FIGS. 34A-34C and those of a prototype cryobiopsy device implemented in accordance with some embodiments of the disclosed subject matter. As shown in FIG. 35, a device implemented in accordance with some embodiments of the disclosed subject matter has a smaller external diameter than the prior art cryoprobe, and can be operated at lower pressure than a device that uses carbon dioxide as a coolant (for example, at lower pressures carbon dioxide may form dry ice, which can lead to obstruction of the lumen).

Figure 36:
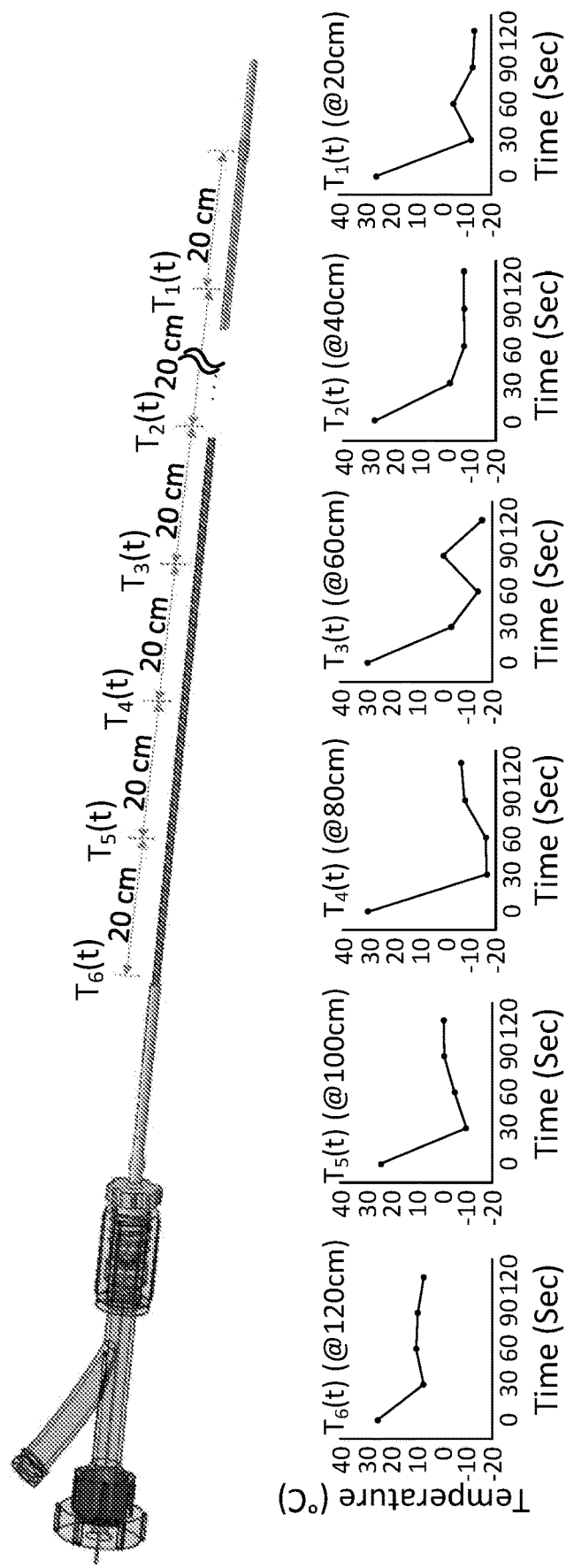
FIG. 36 shows an example of temperatures observed over time, in the absence of an introduction tube, along the length of a dual lumen tube of a device for cryogenic biopsy sampling in accordance with some embodiments of the disclosed subject matter.
Figure 37:
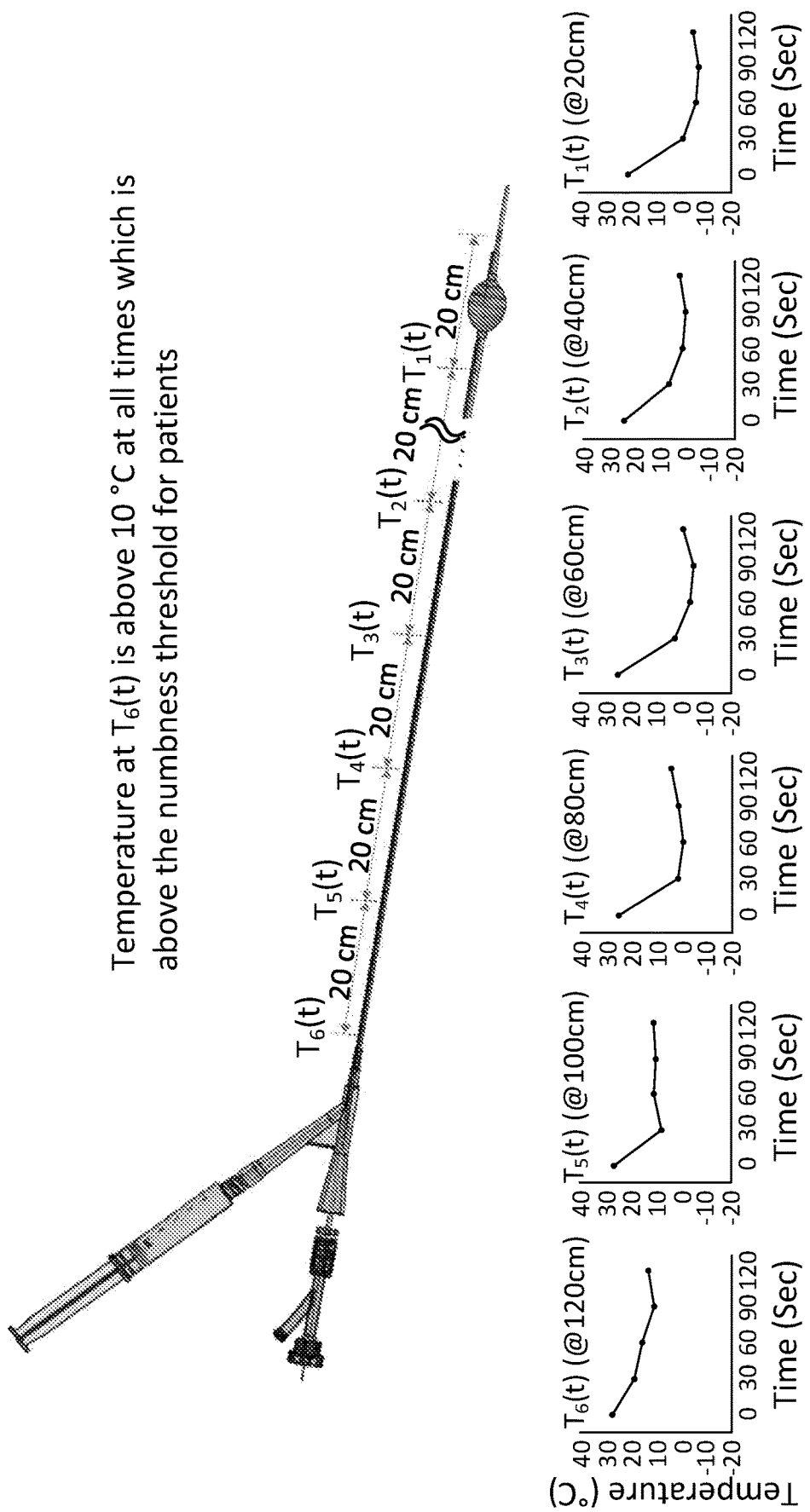
FIG. 37 shows an example of temperatures observed over time along the length of an introduction tube surrounding a dual lumen tube of a device for cryogenic biopsy sampling in accordance with some embodiments of the disclosed subject matter.

FIGS. 36 and 37 show that the use of an introduction tube to deliver the cryogenic probe provides sufficient insulation so that the patient is not exposed to temperatures that cause discomfort or numbing (e.g. temperatures below 10° C.), particularly in body regions closer to the surface which may have more sensory nerve endings. FIG. 36 shows an example of temperatures observed over time, in the absence of an introduction tube, along the length of a dual lumen tube of a device for cryogenic biopsy sampling in accordance with some embodiments of the disclosed subject matter. Without the use of an introduction tube, most of the length of the probe has temperatures below 10° C.

FIG. 37 shows an example of temperatures observed over time along the length of an introduction tube surrounding a dual lumen tube of a device for cryogenic biopsy sampling in accordance with some embodiments of the disclosed subject matter. As shown in FIG. 37, the temperature of the introduction tube over the 40 cm nearest to the proximal end (which may be located, for example, in a patient's nasal cavity) is above about 10° C. throughout the entire period, which is above the numbness threshold for many human subjects. The temperatures shown in FIGS. 36 and 37 were observed with the device exposed to room temperature air.

FIG. 38 shows an example of a system 3800 for cryogenic biopsy sampling with redundant valves in accordance with some embodiments of the disclosed subject matter. As shown in FIG. 38, system 3800 can include a third valve 3802 that can be coupled between valve 1004 and cryogenic biopsy sampling device 100 to provide a redundant controllable fluid connection between coolant storage 1002 and cryogenic biopsy sampling device 100. As described above in connection with FIG. 10, in some embodiments, coolant storage 1002 can be at a relatively high pressure (e.g., compared to atmospheric pressure) such that when valves 1010 and 3802 are opened, coolant flows from coolant storage 1002 through tube 120 and into cryogenic biopsy sampling device 100. In some embodiments, controller 1008 can be configured to control valve 1010 and valve 3802 to provide a mechanism for inhibiting flow of coolant to cryogenic biopsy sampling device 100 in the event that one of the valves malfunctions. In some embodiments, valve 1010 and valve 3802 can be configured to be closed when no signal is supplied from controller 1008, which can cause the valves to close in the event that controller 1008 malfunctions. For example, valve 1010 and/or valve 3802 can be mechanically biased toward a closed position (e.g., using a spring), and a signal from controller 1008 can cause a control mechanism (e.g., a solenoid) to open the valve. Note that although valve 1010 and valve 3802 are shown in FIG. 38 as receiving different control signals ($V_1$ and $V_1'$), this is merely an example, and the valves can be coupled to the same control signal. For example, both valve 1010 and valve 3802 can be coupled to $V_1$ (e.g., via a common node).

In some embodiments, valve 1010 and valve 3802 can be coupled to sensors that are configured to determine a state of the valve. For example, valve 1010 and/or valve 3802 can be associated with flow sensors that are configured to output a first value (e.g., a logic 1, a digital High signal) that indicates that the valve is open and/or that fluid is flowing through the valve, and a second value (e.g., a logic 0, a digital Low signal) that indicates that the valve is closed and/or the fluid is not flowing through the valve. Additionally or alternatively, in some embodiments, a control signal used by the valve can be used as an indication of whether the valve is open or closed in addition to or in lieu of a separate sensor. For example, the valve can be configured to generate a first signal that is used to drive a valve mechanism when the valve is to be closed (e.g., a logic 0, an analog signal having a first current and/or voltage), and can be configured to generate a different signal that is used to drive the valve mechanism when the valve is to be open (e.g., a logic 1, an analog signal having a different current and/or voltage). In some embodiments, sensors coupled to valve 1010 and valve 3802 can be configured to output a signal that is indicative of an operational state of the valve. For example, the sensors can be configured to output a high signal (e.g., a logic 1) when the valve is in an open state, and a low signal (e.g., a logic 0) when the valve is in a closed position.

In some embodiments, system 3800 can include a feedback component 3804, and the sensors coupled to valve 1010 and valve 3802 can output signals indicative of the operational state of the valves to feedback component 3804. In some embodiments, feedback component 3804 can be implemented using any suitable technique or combination of techniques. For example, feedback component 3804 can be implemented as a feedback circuit using programmable and/or hard-wired logic. In a more particular example, feedback component 3804 can be implemented using an FPGA, an ASIC, any other suitable technique, or any suitable combination of techniques. In some embodiments, feedback component 3804 can be implemented in software and/or firmware. For example, feedback component 3804 can be implemented by a CPU, a GPU, an MCU, a system on a chip, or any other suitable processor. In some embodiments, feedback component 3804 can be a discrete component. Alternatively, feedback component 3804 can be implemented as part of controller 1008.

In some embodiments, feedback component 3804 can be configured to output a signal to controller 1008 (or alternatively to another component of controller 1008 is feedback component 3804 is integral to controller 1008) indicative of the state of at least a portion of system 3800. For example, feedback component 3804 can be configured to output a low signal (e.g., a logic 0) when the system is operational, and a high signal (e.g., a logic 1) when valve 1010 and/or valve 3802 may have failed.

In some embodiments, during a biopsy procedure, controller 1008 can control operation of valve 1010 and valve 3802 to provide a continuous or intermittent flow of coolant through tip 104, which can then exit via arm 112 (e.g., which can be connected to a coolant collection system, not shown). In some embodiments, controller 1008 can be configured to output a voltage that would ordinarily cause valve 1010 and valve 3802 to close (e.g., a low signal) if feedback component 3804 indicates that there has been a failure in at least one of valve 1010 and valve 3802. Note that, although not shown in FIG. 38, in some embodiments, controller 1008 can be configured to control a state of valve 1004, and upon receiving a signal from feedback component 3804 indicative of a failure controller 1008 can cause valve 1004 to close inhibiting flow of coolant to cryogenic biopsy sampling device 100.

FIG. 39 shows an example of another system 3900 for cryogenic biopsy sampling with redundant valves and a suction device in accordance with some embodiments of the disclosed subject matter. As shown in FIG. 39, system 3900 can include a flow sensor 3902 which can be configured to detect a rate at which coolant is exiting cryogenic biopsy sampling device 100. Note that although system 3900 includes pump 1202, valve 1204, and valve 3802, this is merely an example, and flow sensor 3902 can be configured to provide feedback regarding the amount of coolant returning from tip 104. In some embodiments, flow sensor 3902 can be configured to detect changes in the fluid flow exiting cryogenic biopsy sampling device 100, which can indicate that there is a leak from somewhere within cryogenic biopsy sampling device 100 (e.g., a leak at tip 104, or a leak along dual lumen tube 106).

In some embodiments, flow sensor 3902 can be coupled to a feedback component 3904, which may or may not receive signals from one or more other components, such as controller 1008, valve 1010, and/or valve 3802. In some embodiments, feedback component 3904 can receive a signal from controller 1008 corresponding to a control signal for valve 1204. In some embodiments, a signal from flow sensor 3902 can indicate whether the flow of coolant (and/or other fluids) exiting cryogenic biopsy sampling device 100 is at least a threshold value. For example, flow sensor 3902 can output a first value (e.g., a logic 0) if the flow is at least the threshold, and can output a second value (e.g., a logic 1) if the flow falls below the threshold. In a more particular example, the threshold can be set to any suitable value, such as a value in a range of 40 to 100 milliliters per minute (ml/min), such as 40 ml/min, 50 ml/min, 60 ml/min, 70 ml/min, 80 ml/min, 90 ml/min, etc. In some embodiments, the signal from flow sensor 3902 can be delayed by an amount of time that is expected to elapse between when fluid is introduced into tube 120 until it reaches flow sensor 3902, as the flow rate may initially be zero before fluid (e.g., coolant) is introduced into cryogenic biopsy sampling device 100.

In some embodiments, feedback component 3904 can be implemented using any suitable technique or combination of techniques. For example, feedback component 3904 can be implemented as a feedback circuit using programmable and/or hard-wired logic. In a more particular example, feedback component 3904 can be implemented using an FPGA, an ASIC, any other suitable technique, or any suitable combination of techniques. In some embodiments, feedback component 3904 can be implemented in software and/or firmware. For example, feedback component 3904 can be implemented by a CPU, a GPU, an MCU, a system on a chip, or any other suitable processor. In some embodiments, feedback component 3904 can be a discrete component. Alternatively, feedback component 3904 can be implemented as part of controller 1008.

In some embodiments, feedback component 3904 can be configured to output a signal to controller 1008 (or alternatively to another component of controller 1008 is feedback component 3904 is integral to controller 1008) indicative of the state of at least a portion of system 3900. For example, feedback component 3904 can be configured to output a low signal (e.g., a logic 0) when the system is operational, and a high signal (e.g., a logic 1) when valve 1010 or valve 3802 fails, or when flow of fluid existing cryogenic biopsy sampling device 100 drops below a threshold value. In some embodiments, feedback component 3804 or 3904 can receive any other suitable signals that are indicative of operation of cryogenic biopsy sampling device 100, such as a signal indicative of a temperature at tip 104, or a pressure at an exit of cryogenic biopsy sampling device 100. For example, if the temperature at tip 104 falls below a threshold (e.g., −35° C.), a feedback component can output a signal that causes controller 1008 to inhibit further cooling of tip 104. As another example, if pressure within arm 112 falls below a threshold (e.g., 1 pound per square inch), a feedback component can output a signal that causes controller 1008 to inhibit further cooling of tip 104. In such an example, a pressure gauge and/or pressure sensor can be placed in fluid communication with arm 112.

As described above in connection with FIG. 38, in some embodiments, controller 1008 can be configured to output a voltage that would ordinarily cause valve 1010 and valve 3802 to close (e.g., a low signal) if the feedback component (e.g., feedback component 3804 or feedback component 3904) indicates that there has been a failure in at least one of valve 1010 and valve 3802, or that another failure condition has occurred.

FIGS. 40 and 41 show example of feedback circuits that can be used in control of redundant valves of a system for cryogenic biopsy sampling in accordance with some embodiments of the disclosed subject matter. As shown in FIGS. 40 and 41, one example implementation for feedback component 3804 and feedback component 3904 can include multiple AND gates that receive control signals, and feedback signals, respectively. The outputs of these AND gates can be coupled to inputs of a NAND gate, such that if there is a mismatch between the control signals (e.g., $V_1$ and $V_1'$) and/or between the feedback signals, (e.g., from valve 1010 and valve 3802, and in the example of FIG. 41 from valve 4002) the output of one of the AND gates becomes a logic 0, causing the NAND gate to output a logic 1. The NAND gate can be coupled to the input of an OR gate configured to act as a monostable multivibrator that is configured to output a logic 0 until the output of the NAND gate becomes a logic 1. Note that these are just a few simplified examples, and in practice feedback component 3804 and/or feedback component 3904 can be implemented with many different configurations.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any other suitable media that is fleeting and devoid of any semblance of permanence during transmission, and/or any suitable intangible media.

It will be appreciated by those skilled in the art that while the disclosed subject matter has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is hereby incorporated by reference, as if each such patent or publication were individually incorporated by reference herein.

Various features and advantages of the invention are set forth in the following claims.

What is claimed is:

1. A device for cryogenic biopsy sampling, comprising:
   an imaging system;
   a dual lumen tube having a proximal end and a distal end;
   an elongated probe element coupled to the distal end of the dual lumen tube,
      a first lumen of the dual lumen tube extending into a hollow portion of the elongated probe element, and
      a second lumen of the dual lumen tube being in fluid communication with the hollow portion,
         wherein the hollow portion extends to a distal tip of the elongated probe element, and
         wherein the hollow portion at the distal tip of the elongated probe element is configured to contact a tissue sample;
   a housing coupled to the proximal end of the dual lumen tube;
   a first port coupled to the housing and in fluid communication with the first lumen;
   a second port coupled to the housing and in fluid communication with the second lumen, the first lumen, the elongated probe element, and the second lumen being configured to provide a closed pathway through which a coolant introduced through the first port flows through the first lumen and expands within the elongated probe element and out of the elongated probe element through the second lumen to the second port; and an optical fiber disposed within the second lumen of the dual lumen tube,
   wherein the optical fiber extends through a distal end of the elongated probe element,
   wherein the optical fiber is optically coupled to the imaging system, and
   wherein optical signals from the optical fiber are transmitted to the imaging system and are used to determine a distance to the tissue sample.

2. The device for cryogenic biopsy sampling of claim 1, wherein the elongated probe element comprises aluminum.

3. The device for cryogenic biopsy sampling of claim 1, wherein at least a portion of an inner surface of the elongated probe element is textured.

4. The device for cryogenic biopsy sampling of claim 3, wherein the textured inner surface comprises threads.

5. The device for cryogenic biopsy sampling of claim 1, wherein a portion of the closed pathway between the distal end of the first lumen and the distal end of the second lumen is narrower than surrounding portions of the closed pathway to reduce the rate at which the coolant flows out of the elongated probe element into the second lumen.

6. The device for cryogenic biopsy sampling of claim 1, wherein the optical fiber has a proximal end and a distal end,
   wherein the optical fiber is coupled to the dual lumen tube such that light introduced at the proximal end of the optical fiber is conveyed toward the distal end of the dual lumen tube.

7. The device for cryogenic biopsy sampling of claim 1, further comprising:
   a thermocouple in contact with the elongated probe element; and
   a wire having a distal end and a proximal end,
      wherein the distal end is electrically coupled to the thermocouple, and
      wherein the wire extends along the length of the second lumen.

8. The device for cryogenic biopsy sampling of claim 1, wherein the elongated probe element has an exterior diameter of less than about 2 millimeters.

9. A system for cryogenic biopsy sampling, comprising:
an imaging system;
a cryogenic probe comprising:
   a dual lumen tube having a proximal end and a distal end; and
   an elongated probe element coupled to the distal end of the dual lumen tube,
      a first lumen of the dual lumen tube extending into a hollow portion of the elongated probe element, and
      a second lumen of the dual lumen tube being in fluid communication with the hollow portion,
         wherein the hollow portion extends to a distal tip of the elongated probe element, and
         wherein the hollow portion at the distal tip of the elongated probe element is configured to contact a tissue sample;
a first port in fluid communication with the first lumen;
a second port in fluid communication with the second lumen;

an optical fiber disposed within the second lumen of the dual lumen tube,
   wherein the optical fiber extends through a distal end of the elongated probe element,
   wherein the optical fiber is optically coupled to the imaging system, and
   wherein optical signals from the optical fiber are transmitted to the imaging system and are used to determine a distance to the tissue sample;
an electronically controllable valve coupled to the first port, wherein the electronically controllable valve provides a connection between the first port and a coolant storage vessel; and
a controller to:
   open the valve during a first period of time to cause coolant to flow from the coolant storage vessel through the first port and the first lumen into the elongated probe element,
      wherein the coolant expands within the elongated probe element, and
   close the valve during a second period of time subsequent to the first period of time, wherein coolant flows from the elongated probe element through the second lumen and out of the second port of the proximal housing during at least the second period of time.

10. The system for cryogenic biopsy sampling of claim 9, wherein the optical fiber has a proximal end and a distal end,
   wherein the optical fiber is coupled to the dual lumen tube such that light introduced at the proximal end of the optical fiber is conveyed toward the distal end of the dual lumen tube.

11. The system for cryogenic biopsy sampling of claim 10, wherein the imaging system comprises an optical coherence tomography imaging system,
   wherein the optical coherence tomography imaging system is configured to:
      provide light to the proximal end of the optical fiber such that the light is emitted from the distal end of the optical fiber to be reflected by tissue disposed in front of the elongated probe element;
      receive light from the distal end of the optical fiber that has been reflected from the tissue disposed in front of the elongated probe element; and
      generate image data using the received light that is indicative of a distance between a distal end of the elongated probe element and the tissue.

12. The system for cryogenic biopsy sampling of claim 10, further comprising:
   wherein the imaging system comprises:
      at least one light source that is to emit light of at least two different wavelengths, and
      at least one detector to measure the amount of each of the light of at two different wavelengths that are received by the imaging system, wherein the imaging system is to:
         provide the light of at least two different wavelengths to the proximal end of the optical fiber such that the light of at least two different wavelengths is emitted from the distal end of the optical fiber toward a distal end of the elongated probe element,
         detect the amounts of the light of at least two different wavelengths received from the distal end of the optical fiber that has been reflected, and detect the presence of blood based on a ratio of the amounts of the light of at least two different wavelengths.

13. The system for cryogenic biopsy sampling of claim 9, further comprising a second electronically controllable valve coupled to the second port,
wherein the second electronically controllable valve provides a connection between the second port and a pump, and
wherein the controller is further to:
close the second valve during the first period of time to inhibit the pump from providing suction at the second port, and
open the second valve during a third period of time subsequent to the first period of time to provide suction at the second port, which causes the coolant to flow from the elongated probe element through the second port at a faster rate,
wherein at least a portion of the third period of time coincides with at least a portion of the second period of time.

14. The system for cryogenic biopsy sampling of claim 9, further comprising:
a thermocouple in contact with the elongated probe element; and
a wire providing an electrical connection between the thermocouple and the controller,
wherein the controller is further to:
provide a control signal to the first valve that causes the first valve to repeatedly open and close, intermittently causing the coolant to flow from the coolant storage vessel through the first port and the first lumen into the elongated probe element,
wherein the control signal has a plurality of properties including a frequency and a duty cycle,
determine a rate at which a temperature near the elongated probe element is changing based on signals received from the thermocouple, and
alter at least one of the plurality of properties based on the rate at which the temperature is changing to affect the rate at which the temperature is changing.

15. The system for cryogenic biopsy sampling of claim 9, wherein the coolant comprises $CH_2FCF_3$ that undergoes a phase change from liquid to gas within the hollow portion of the elongated probe element.

16. The system for cryogenic biopsy sampling of claim 9, wherein the electronically controllable valve is a first electronically controllable valve, the system further comprising:
a second electronically controllable valve coupled to the first port, wherein the second electronically controllable valve provides a second connection between the first port and a coolant storage vessel serially with the first electronically controllable valve; and
a feedback component that is configured to receive signals from the first electronically controllable valve and the second electronically controllable valve, the feedback component configured to:
determine that one or both of the first electronically controllable valve and the second electronically controllable valve have failed based on a signal from at least one of the first electronically controllable valve and the second electronically controllable valve; and
in response to determining that one or both of the first electronically controllable valve and the second electronically controllable valve have failed, output a signal to the controller that is indicative of a failure.

17. The system for cryogenic biopsy sampling of claim 9, further comprising:
a flow sensor that is configured to measure a flow rate of fluid from the second lumen; and
a feedback component that is configured to receive signals from the flow sensor, the feedback component configured to:
determine that the flow rate has fallen below a threshold based on a signal received from the flow sensor; and
in response to determining that the flow rate has fallen below a threshold, output a signal to the controller that is indicative of a failure.

* * * * *